(12) United States Patent
Kominami et al.

(10) Patent No.: US 12,106,447 B2
(45) Date of Patent: Oct. 1, 2024

(54) IMAGE DATA PROCESSING SYSTEM, UNMANNED AERIAL VEHICLE, IMAGE DATA PROCESSING METHOD, AND NON-TRANSITORY COMPUTER-READABLE RECORDING MEDIUM

(71) Applicant: Toyo Seikan Co., Ltd., Tokyo (JP)

(72) Inventors: Atsushi Kominami, Kanagawa (JP); Souji Araki, Kanagawa (JP)

(73) Assignee: Toyo Seikan Co., Ltd., Tokyo (JP)

(*) Notice: Subject to any disclaimer, the term of this patent is extended or adjusted under 35 U.S.C. 154(b) by 490 days.

(21) Appl. No.: 17/627,814

(22) PCT Filed: Jul. 21, 2020

(86) PCT No.: PCT/JP2020/028344
§ 371 (c)(1),
(2) Date: Jan. 18, 2022

(87) PCT Pub. No.: WO2021/015215
PCT Pub. Date: Jan. 28, 2021

(65) Prior Publication Data
US 2022/0253973 A1  Aug. 11, 2022

(30) Foreign Application Priority Data
Jul. 23, 2019  (JP) ................ 2019-135194

(51) Int. Cl.
*G06T 3/4038* (2024.01)
*B64D 1/18* (2006.01)
(Continued)

(52) U.S. Cl.
CPC .......... *G06T 3/4038* (2013.01); *B64D 1/18* (2013.01); *G06T 7/0004* (2013.01); *H04N 5/33* (2013.01);
(Continued)

(58) Field of Classification Search
CPC ................ G06T 3/4038; G06T 7/0004; G06T 2207/10032; G06T 2207/10048;
(Continued)

(56) References Cited

U.S. PATENT DOCUMENTS 11,297,820 B1* 4/2022 Tang ................... A01M 7/0089
11,921,493 B2* 3/2024 Jayaprakash .......... G06V 20/60
(Continued)

FOREIGN PATENT DOCUMENTS

CN 105960800 A 9/2016
CN 108197563 A 6/2018
(Continued)

OTHER PUBLICATIONS

Office Action issued for counterpart Taiwanese Application 109124951 issued by the Taiwan Intellectual Property Office on Jun. 8, 2023.
(Continued)

*Primary Examiner* — Gabriel I Garcia

(57) ABSTRACT

An image data processing system is provided including: a discharge portion for discharging a content in a container onto a subject to form a sprayed symbol; a camera for capturing an image of a region including the sprayed symbol on the subject; and an image superimposition processing portion for performing an image superimposition process on the image using the sprayed symbol as a reference point. The camera may include a visible light camera for a visible light image and an infrared camera for capturing a thermal image of a subject.

19 Claims, 22 Drawing Sheets

(51) Int. Cl.
  *G06T 7/00* (2017.01)
  *H04N 5/33* (2023.01)
  *B64U 10/14* (2023.01)
  *B64U 20/87* (2023.01)
  *B64U 30/21* (2023.01)
(52) U.S. Cl.
  CPC .............. *B64U 10/14* (2023.01); *B64U 20/87* (2023.01); *B64U 30/21* (2023.01); *B64U 2201/10* (2023.01); *G06T 2207/10032* (2013.01); *G06T 2207/10048* (2013.01); *G06T 2207/30136* (2013.01); *G06T 2207/30252* (2013.01)
(58) Field of Classification Search
  CPC .. G06T 2207/3036; G06T 2207/30252; B64D 1/18; B64U 2201/10; B64U 20/87; B64U 10/14; B64U 30/21; H04N 5/33
  See application file for complete search history.

(56) References Cited

U.S. PATENT DOCUMENTS

| | | | |
|---|---|---|---|
| 2003/0081827 A1* | 5/2003 | Paz-Pujalt | G06T 7/254 382/152 |
| 2014/0240451 A1 | 8/2014 | Sakano | |
| 2017/0006234 A1 | 1/2017 | Higuchi | |
| 2019/0199898 A1 | 6/2019 | Yonishi | |
| 2019/0205699 A1 | 7/2019 | Hong | |
| 2019/0206013 A1 | 7/2019 | Okuyama | |
| 2021/0018910 A1* | 1/2021 | Li | B64C 39/024 |
| 2022/0212796 A1* | 7/2022 | Faers | B64U 60/40 |
| 2022/0225584 A1* | 7/2022 | Farrand | G06V 20/188 |

FOREIGN PATENT DOCUMENTS

| | | |
|---|---|---|
| CN | 109417598 A | 3/2019 |
| JP | H01191212 A | 8/1989 |
| JP | H06178965 A | 6/1994 |
| JP | 2008045888 A | 2/2008 |
| JP | 2014164363 A | 9/2014 |
| JP | 5795850 B2 | 10/2015 |
| JP | 2019118043 A | 7/2019 |
| KR | 101785202 B1 | 10/2017 |
| WO | 9737336 A1 | 10/1997 |
| WO | 2016098146 A1 | 6/2016 |
| WO | 2018096577 A1 | 5/2018 |

OTHER PUBLICATIONS

ISA/237) Written Opinion of the International Search Authority for International Patent Application No. PCT/JP2020/028344, mailed by the Japan Patent Office on Sep. 8, 2020.
Office Action issued for counterpart Chinese Application 202080016225. X, issued by The State Intellectual Property Office of People's Republic of China on Sep. 9, 2023.
Wang Shumin et al., Digital photogrammetry system based on unmanned airship and aerial image sequence stitching, Science of Surveying and Mapping, Apr. 2010, pp. 81-83, vol. 35.
S. Di Romualdo et al., Superimposition of thermal imaging to visual imaging using homography, Proceedings of the 29th Annual International Conference of the IEEE EMBS Cité Internationale, Lyon, France, Aug. 23-26, 2007, pp. 3365-3368.

* cited by examiner

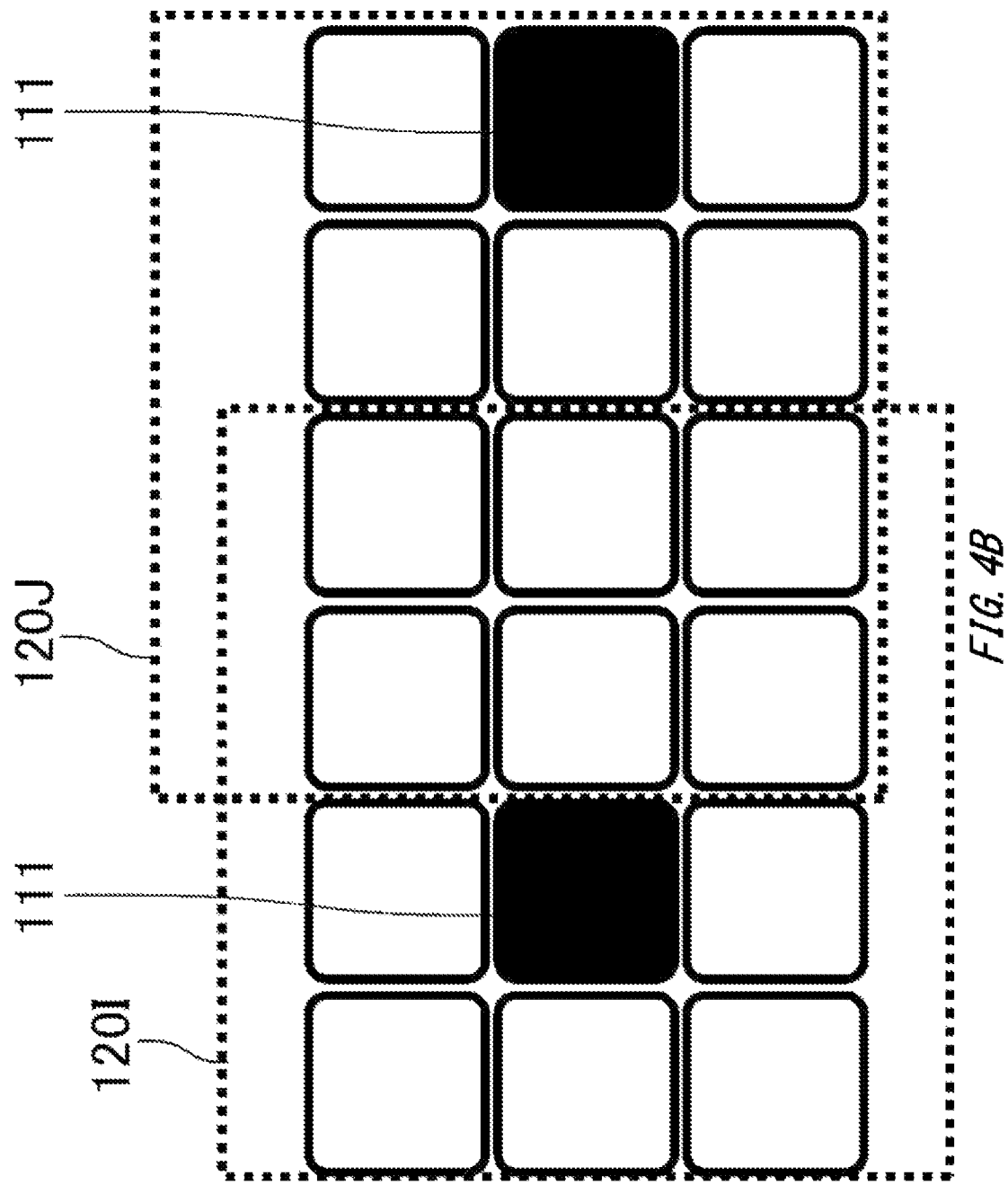

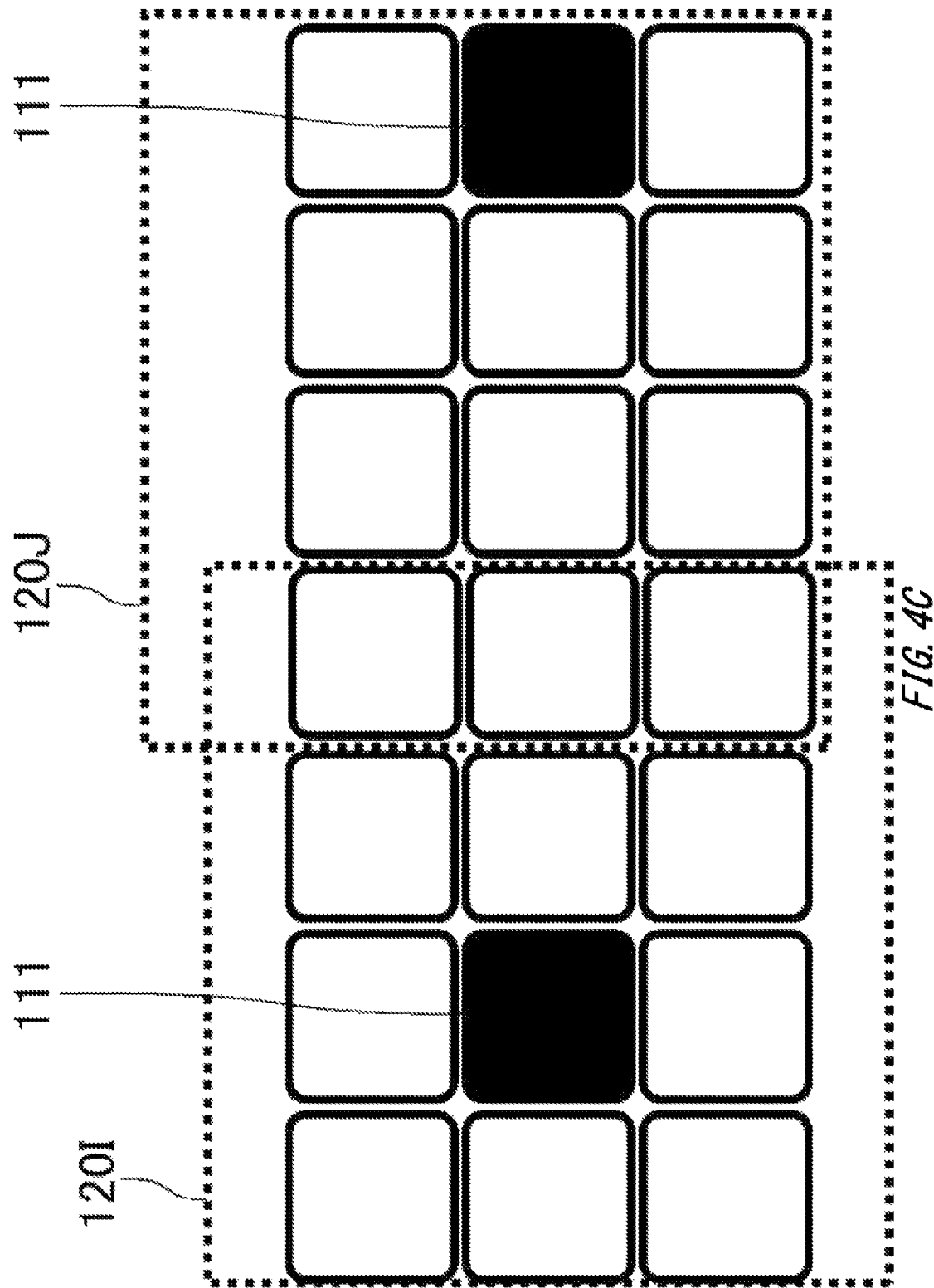

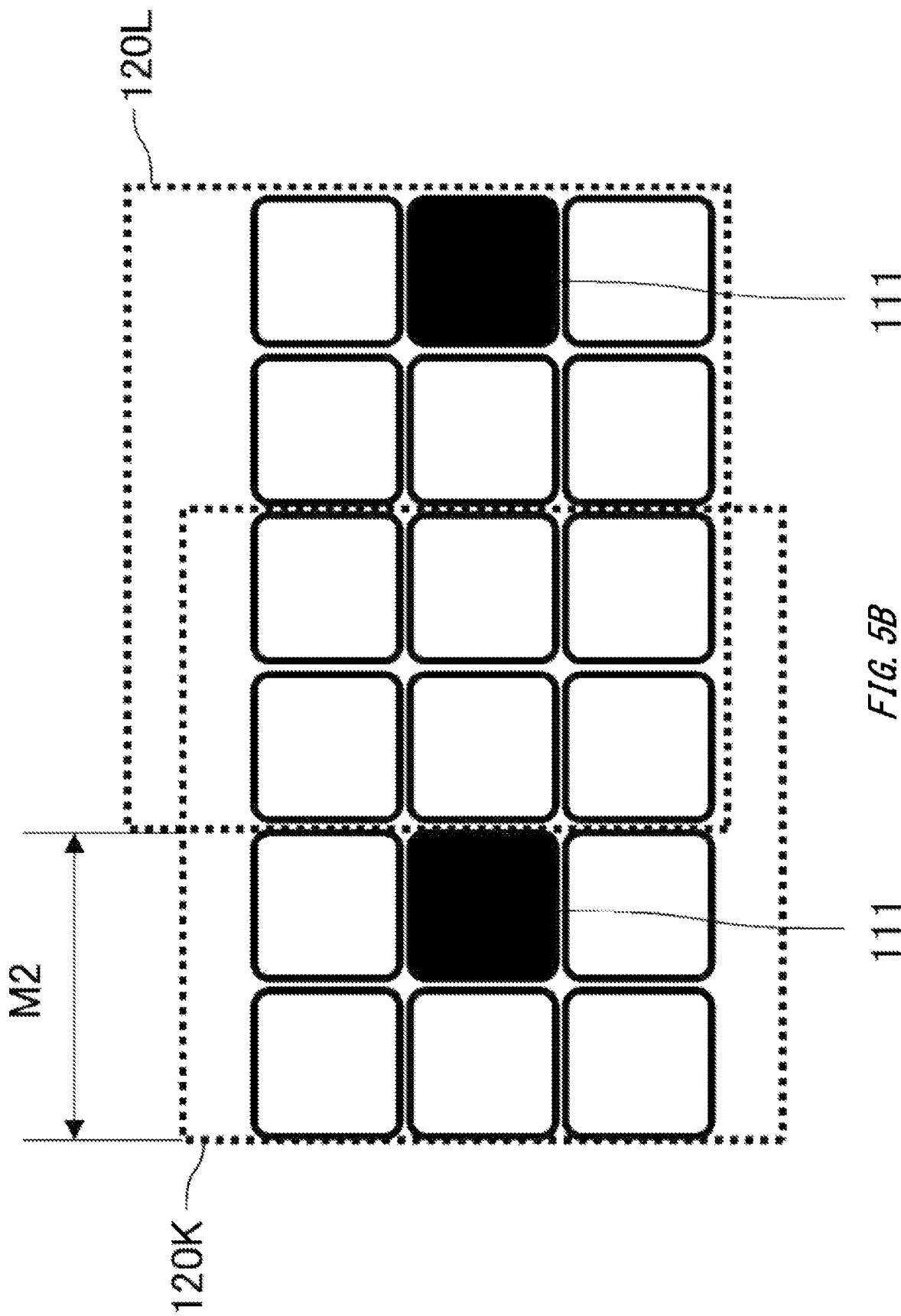

IMAGE DATA PROCESSING SYSTEM, UNMANNED AERIAL VEHICLE, IMAGE DATA PROCESSING METHOD, AND NON-TRANSITORY COMPUTER-READABLE RECORDING MEDIUM

CROSS-REFERENCE TO RELATED APPLICATIONS

This application is a National Stage Entry of International Application No. PCT/JP2020/028344 filed on Jul. 21, 2020, which claims priority to Japanese Patent Application No. 2019-135194 filed on Jul. 23, 2019, the contents of each of which are hereby incorporated by reference in their entirety.

BACKGROUND

1. Technical Field

The present invention relates to an image data processing system, an unmanned aerial vehicle, an image data processing method, and a non-transitory computer-readable recording medium.

2. Related Art

Conventionally, there has been no known example in which a sprayed symbol from a discharge apparatus of an unmanned aerial vehicle is used as a mark for image synthesis during an image superimposition process (see, for example, Patent documents 1 and 2).

PRIOR ART DOCUMENT

Patent Document

[Patent Document 1] Japanese Patent No. 5795850
[Patent Document 2] Japanese Patent Application Publication No. 2008-045888

GENERAL DISCLOSURE

There is provided an image data processing system that performs an appropriate image superimposition process on a subject that has few features to be used as a reference point for an image synthesis.

In order to solve the above-described problem, a first aspect of the present invention provides an image data processing system including a discharge apparatus that discharges the content within a container onto a subject to form a sprayed symbol, a camera that captures an image of a region including the sprayed symbol of the subject, and an image superimposition processing portion that performs an image superimposition process on the image using the sprayed symbol as a reference point.

The camera may have a visible light camera for a visible light image and an infrared camera that captures a thermal image of the subject. The discharge apparatus may use the content to form a different temperature area on the surface of the subject that has a temperature different from other parts of the subject. The infrared camera may capture a thermal image of a region including the different temperature area. In the image superimposition process of the thermal image and the visible light image, the image superimposition processing portion may use the different temperature area and the sprayed symbol as reference points in the image superimposition process.

The content may have a vaporizable component, and the different temperature area may be formed through the vaporization heat during the evaporation of the content discharged onto the subject.

The image data processing system may further include a connectivity evaluation portion that evaluates the difficulty of the image superimposition process based on the continuity of the superimposed part of the image in the image superimposition process. If the connectivity evaluation portion evaluates that the image superimposition process on the image in which the subject is captured is difficult, the discharge apparatus may form the sprayed symbol.

The connectivity evaluation portion may perform the feature point extraction process within the image captured by the camera. The connectivity evaluation portion may evaluate the difficulty of the image superimposition process based on the quantity of the obtained feature points.

The connectivity evaluation portion may sense whether there is a periodically repeated pattern. The connectivity evaluation portion may evaluate the difficulty based on the sensing result.

The connectivity evaluation portion may attempt the image superimposition process of the image. The connectivity evaluation portion may evaluate the difficulty based on the attempt result.

The image superimposition process may include a connection process of a plurality of images.

The image superimposition process may include a synthetic process of a plurality of images.

The image data processing system may further include a light for shooting in the dark.

The image data processing system may further include a temperature adjustment apparatus that adjusts the temperature of the content to a temperature different from the surface temperature of the subject.

The content may be colored.

The container may be an aerosol container.

A second aspect of the present invention provides an unmanned aerial vehicle incorporating the image data processing system.

A third aspect of the present invention provides an image data processing method including: discharging the content within a container incorporated in the unmanned aerial vehicle onto a subject to form a sprayed symbol; capturing a plurality of images related to a region of the subject including the sprayed symbol; and processing the image data of the plurality of images using the sprayed symbol as the reference point for the image superimposition process.

The image data processing method may include capturing the surface profile of the subject; and determining, based on the capture surface profile, whether to discharge the content onto the subject.

The determining whether to discharge the content onto the subject may include, if the surface profile has unevenness that is not deeper than a predetermined first threshold value, determining that the surface profile has a smooth surface and then determining to discharge the content.

The determining whether to discharge the content onto the subject may include, if the surface profile has a scratch or unevenness that is deeper than a predetermined second threshold value, determining to discharge the content onto the subject. The capturing the plurality of images may include capturing the subject at a predetermined first distance and capturing the subject at a second distance, which is farther than the first distance.

A fourth aspect of the present invention provides a program that causes a computer to perform the image data processing method.

The summary clause does not necessarily describe all necessary features of the embodiments of the present invention. The present invention may also be a sub-combination of the features described above.

BRIEF DESCRIPTION OF THE DRAWINGS

FIG. 4B illustrates a successful example of the image superimposition process of the subject 110 in the comparative example.

FIG. 4C illustrates an unsuccessful example of the image superimposition process of the subject 110 in the comparative example.

FIG. 5B illustrates an example in which the image superimposition process is determined to be easy based on the moving distance of the unmanned aerial vehicle 100.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1A:
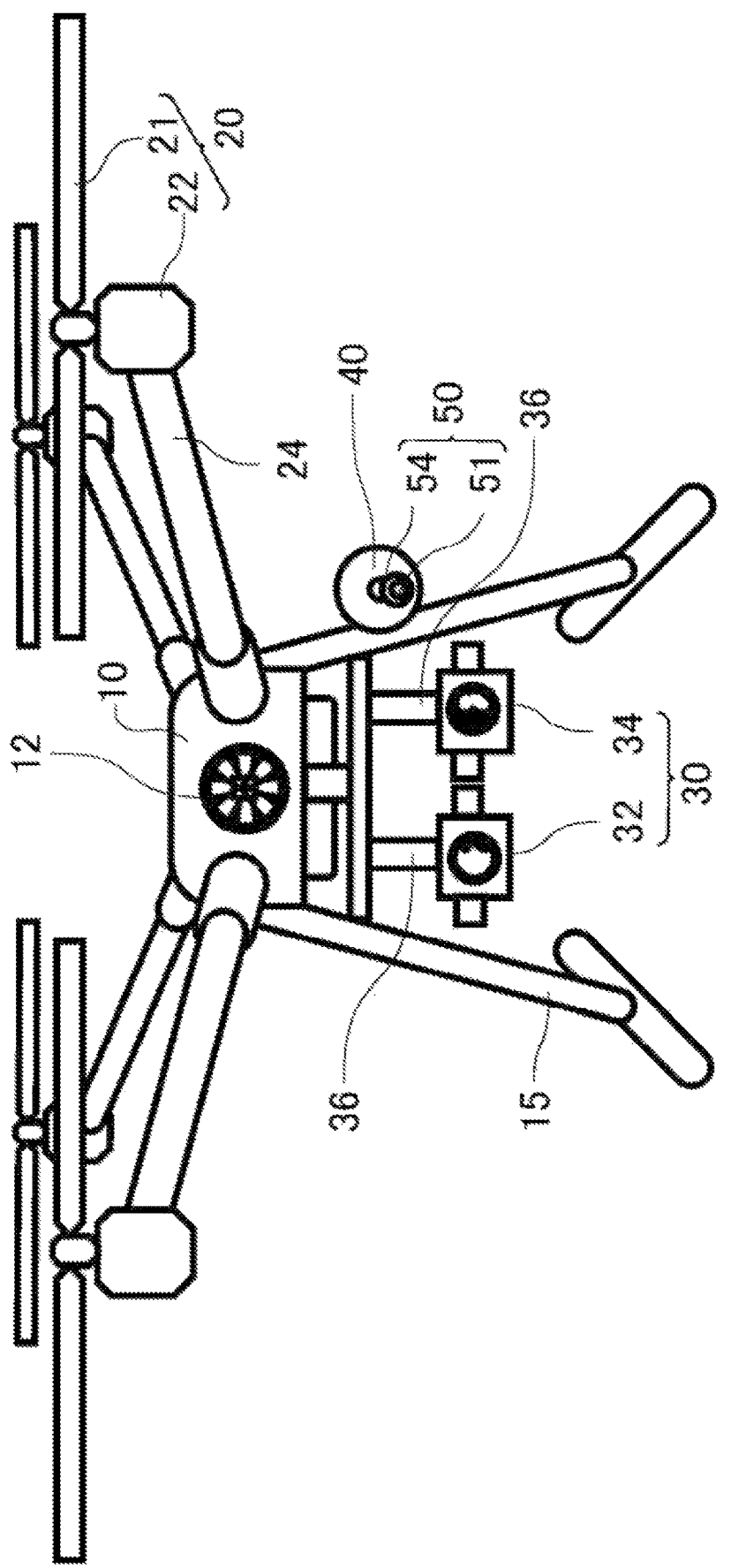
FIG. 1A illustrates one example of a front view of an unmanned aerial vehicle 100.
Figure 1B:
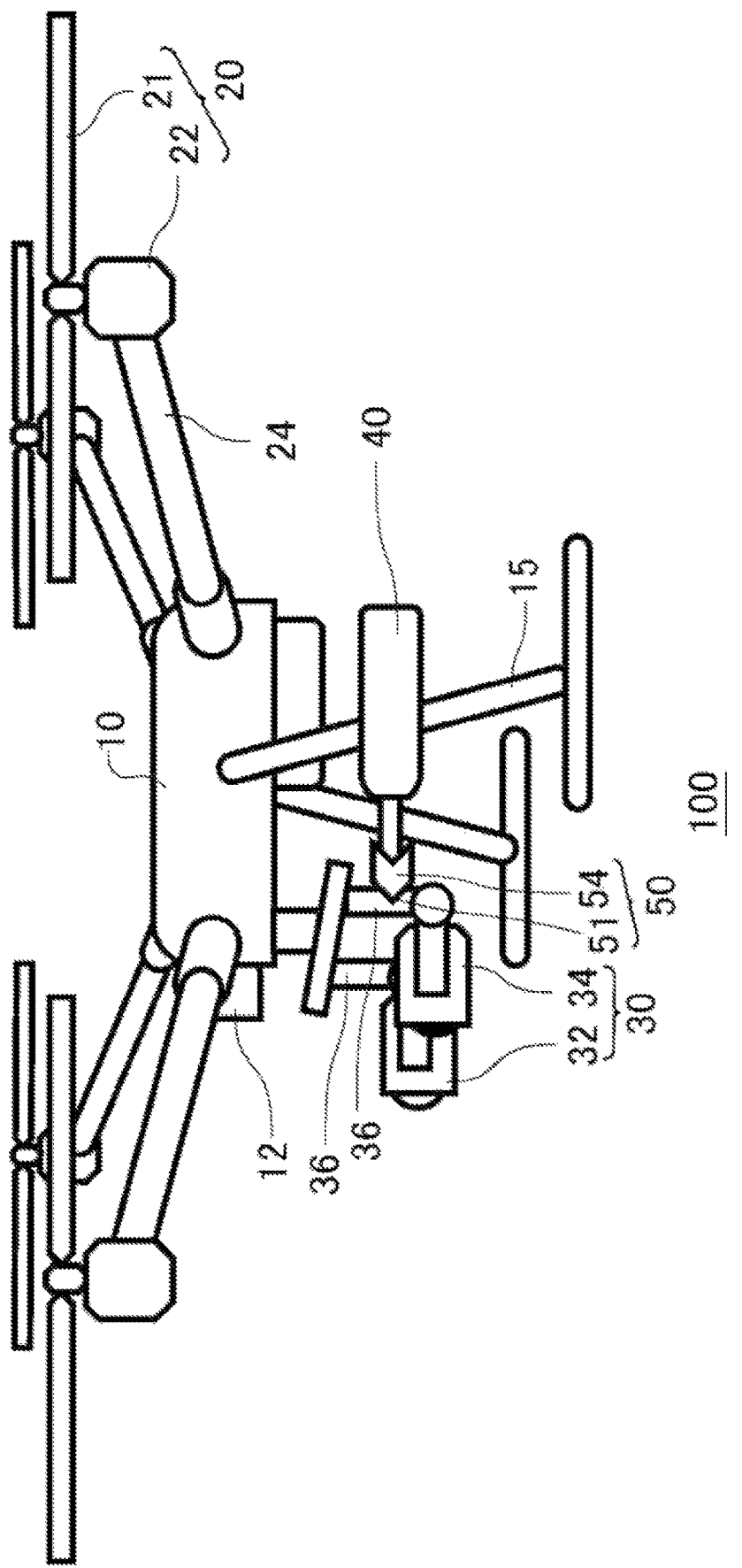
FIG. 1B illustrates one example of a side view of the unmanned aerial vehicle 100.

FIG. 1A illustrates one example of the front view of the unmanned aerial vehicle 100. FIG. 1B illustrates one example of the side view of the unmanned aerial vehicle 100 according to FIG. 1A.

The unmanned aerial vehicle 100 is a flying body that flies in the air. The unmanned aerial vehicle 100 in the present example includes a body portion 10, a propelling portion 20, a camera 30, a discharge portion 50, and a discharge apparatus 500. It is noted that, in this specification, the side of the body portion 10 on which a light 12 is provided is referred to as front side of the unmanned aerial vehicle 100, but the traveling direction during flight is not limited to the front direction. A discharge apparatus 500 described in detail below has a container holding portion 40, and a temperature adjustment apparatus 70 and a discharge driving portion 80 described below.

The body portion 10 stores various control circuits, a power supply, and the like of the unmanned aerial vehicle 100. Furthermore, the body portion 10 may serve as a structure connecting the components of the unmanned aerial vehicle 100 together. The body portion 10 of the present example is connected to the propelling portion 20. The body portion 10 in the present example has the light 12.

The light 12 is used for shooting in the dark. The camera 30 shoots the subject 110 as described below. In a case of a region where the subject 110 is in a shadow and/or a case of shooting at night, the unmanned aerial vehicle 100 may illuminate the subject 110 using the light 12.

The propelling portion 20 propels the unmanned aerial vehicle 100. The propelling portion 20 has a rotary wing 21 and a rotation driving portion 22. The unmanned aerial vehicle 100 in the present example includes four propelling portions 20. The propelling portion 20 is attached to the body portion 10 via an arm portion 24.

The rotation driving portion 22 has a power source such as a motor and drives the rotary wing 21. The rotation driving portion 22 may have a brake mechanism for the rotary wing 21. The rotary wing 21 and the rotation driving portion 22 may be directly attached to the body portion 10 without the arm portion 24.

The arm portion 24 is provided so as to radially extend from the body portion 10. The unmanned aerial vehicle 100 in the present example includes four arm portions 24 provided so as to correspond to four propelling portions 20. The arm portion 24 may be fixed or movable. The arm portion 24 may have another component such as a camera fixed thereto.

The camera 30 shoots the image of the surroundings of the unmanned aerial vehicle 100. The camera 30 in the present example is provided under the body portion 10. In one example, the term "under" refers to the side of the body portion 10 that is opposite to the side on which the rotary wing 21 is provided. In order to control the discharge from the discharge portion 50, the camera 30 captures the subject 110 in the diagram described below. Furthermore, the camera 30 may shoot the video in the discharge direction of the discharge portion 50.

The camera 30 in the present example has a visible light camera 32 and an infrared camera 34. The visible light camera 32 receives the electromagnetic wave in the wavelength region corresponding to the visible light (a wavelength between about 360 nm and about 830 nm) to capture the visible light image. The visible light camera 32 may have a function as a high sensitivity camera that is able to shoot at night.

The infrared camera 34 captures the electromagnetic wave in a longer wavelength region (a wavelength of about 830 nm). In particular, the infrared camera 34 may be an infrared thermography camera that can capture the thermal image of the subject 110 related to the infrared thermography through the electromagnetic wave of mid infrared light (a wavelength between about 3 µm and about 5 µm) or far infrared light (a wavelength between about 8 µm and about 15 µm). The infrared camera 34 may be an infrared night vision camera that is able to shoot at night.

The camera 30 captures a plurality of images of the subject 110 captured from different perspectives as the unmanned aerial vehicle 100 moves. Various image superimposition processes such as synthesis or connection are performed on a plurality of images acquired from varying perspectives of the unmanned aerial vehicle 100 so that the image superimposition process is performed to obtain a clear whole picture of the subject 110. By performing the superimposition process on the image, the whole picture of the subject 110 that can be scaled with a high resolution can be stereoscopically known.

The connecting portion 36 connects the body portion 10 to the camera 30. The connecting portion 36 may be fixed or movable. The connecting portion 36 may be a gimbal for controlling the position of the camera 30 in three axis directions. The connecting portion 36 may control the orientation of the camera 30 according to the discharge direction of the discharge portion 50.

The container holding portion 40 included in the discharge apparatus 500 described below holds the container 60 described below that is filled with the content to be discharged. The container holding portion 40 is connected to the body portion 10. The container holding portion 40 may be connected to a member other than the body portion 10, such as the arm portion 24 or the leg portion 15. In one example, the container holding portion 40 is a cylindrical sleeve that houses the container 60.

The material of the container holding portion 40 is not particularly limited as long as it can hold the shape of the housing portion that houses the container 60. For example, the material of the container holding portion 40 includes a high strength and light weight material such as metal such as aluminum, plastic, or carbon fiber. Furthermore, the material of the container holding portion 40 may include soft material, for example, rubber material such as silicone rubber or urethane foam, besides hard material. It is noted that the container holding portion 40 may further include a temperature adjustment apparatus 70 that increases or maintains the temperature of the container 60 and the content within the container 60 and adjusts the temperature of the content to a temperature different from the surface temperature of the subject 110.

The discharge portion 50 has a discharge outlet 51 and a nozzle 54. The discharge portion 50 carries the content within the container 60 from the nozzle 54 to the discharge outlet 51 and discharges the content from the discharge outlet 51 onto the subject 110 to form the sprayed symbol 130. The content may be colored, and the sprayed symbol 130 may be formed by the shape, design, or color of the content, or the combination thereof. The camera 30 captures the image of the region 120 that includes the sprayed symbol 130 of the subject 110, and the sprayed symbol 130 can be used as a reference point for the image superimposition process.

The leg portion 15 is connected to the body portion 10 and, during landing, holds the posture of the unmanned aerial vehicle 100. The leg portion 15 holds the posture of the unmanned aerial vehicle 100 with the propelling portion 20 stopped. The unmanned aerial vehicle 100 in the present example has two leg portions 15. The leg portion 15 may have the camera 30 or the container holding portion 40 attached thereto.

Figure 1C:
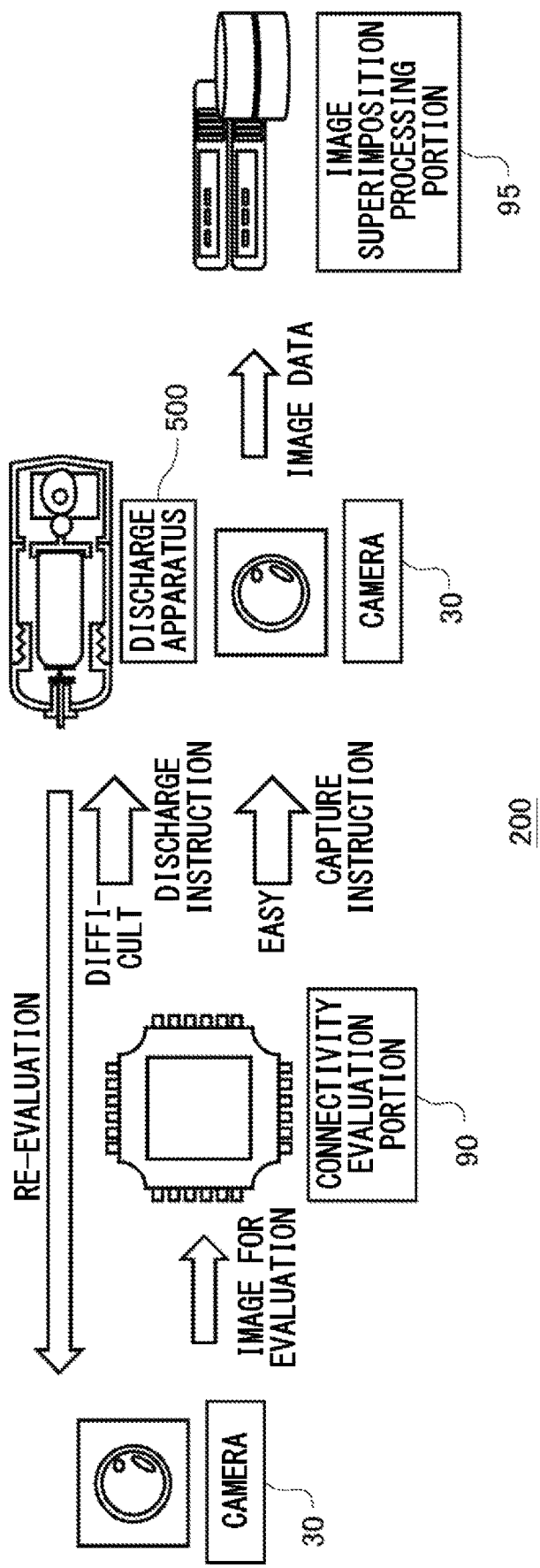
FIG. 1C is a schematic block diagram related to the function of an image data processing system 200.

FIG. 1C is a schematic block diagram related to the function of an image data processing system 200. The image data processing system 200 may be incorporated in the unmanned aerial vehicle 100. However, the unmanned aerial vehicle 100 may have a communication portion that communicates with a computer such as a server provided outside and send the image data to the computer. In other words, the image data processing system 200 may be implemented as a system in which the unmanned aerial vehicle 100 is integrated with a remote computer system such as a server machine or a cloud network.

The image data processing system 200 includes the camera 30, the discharge apparatus 500, the connectivity evaluation portion 90, and the image superimposition processing portion 95. The camera 30 captures a plurality of images of the subject 110 to be a target from varying perspective such that parts of the images are overlapped. The image data of the image of the subject 110 captured by the camera 30 is sent to the connectivity evaluation portion 90.

For the image data of a plurality of images, the connectivity evaluation portion 90 uses the features that exist in the superimposed parts of the images to evaluate whether the image superimposition process such as the connection, synthesis, and alignment of the image is possible. The evaluation of the difficulty of the image superimposition process may be based on whether the superimposed parts of the images in the image superimposition process can be smoothly connected, that is, the continuity of the image. The evaluation of the image superimposition process of the connectivity evaluation portion 90 may be based on actually attempting the image superimposition process. The connectivity evaluation portion 90 may evaluate the difficulty based on the attempt result.

In a case where the connectivity evaluation portion 90 evaluates that the image superimposition process of the image where the subject 110 is captured is difficult, the discharge instruction is sent for causing the discharge apparatus 500 to discharge the content within the container. The discharge apparatus 500 may form the sprayed symbol 130 on the subject 110 using the content. The subject 110 forms the sprayed symbol 130 so that a mark appears on the subject 110 that can be used as the reference point for the image superimposition process. After the discharge apparatus 500 discharges the sprayed symbol 130, the camera 30 may capture a plurality of images of the subject 110 including the sprayed symbol 130 and the connectivity evaluation portion 90 may evaluate the difficulty of the image superimposition process again.

In a case where the connectivity evaluation portion 90 evaluates that the image superimposition process of the image where the subject 110 is captured is easy, a capturing instruction may be sent to the camera 30 again. Based on the capturing instruction, the camera 30 shoots the subject 110 from many perspectives. The image data captured by the camera 30 may be sent to the image superimposition processing portion 95. However, it may be possible that the image data of the subject 110 for the camera 30 is not captured independently of the image for the connectivity evaluation and the image data may be used as it is.

The image superimposition processing portion 95 performs the image superimposition process on the image data sent from the camera 30. The image superimposition processing portion 95 may perform the image superimposition process on the image of the subject 110 using the sprayed symbol 130 as the reference point. By performing the superimposition process on the image captured from varying various perspectives, three-dimensional images of the subject 110 in a wide angle perspective and a proximity perspective in a wide range can be obtained with a high resolution. Furthermore, a smooth continuity can be ensured for a synthesized image and a connected image.

Figure 1D:
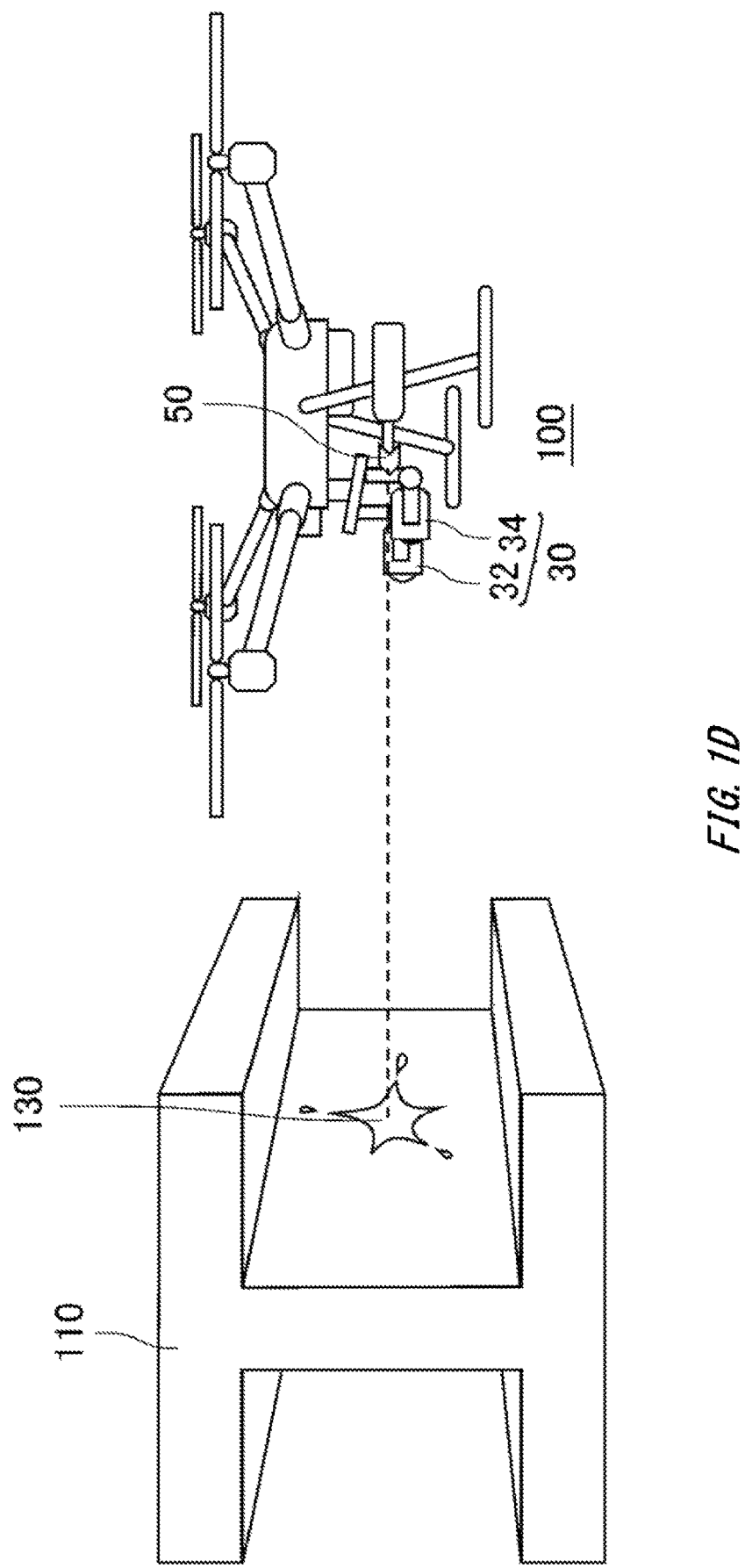
FIG. 1D illustrates one example of the unmanned aerial vehicle 100 that is capturing the subject 110.

FIG. 1D illustrates one example of the unmanned aerial vehicle 100 that is capturing the subject 110. The unmanned aerial vehicle 100 uses the discharge portion 50 to discharge the content onto the subject 110.

The discharge portion 50 uses the content to form the sprayed symbol 130 on the surface of the subject 110. As one example, the content is liquid. However, the content may include a colloidal substance such as gel or sol. The camera 30 captures the image including the sprayed symbol 130 on the subject 110.

Figure 2A:
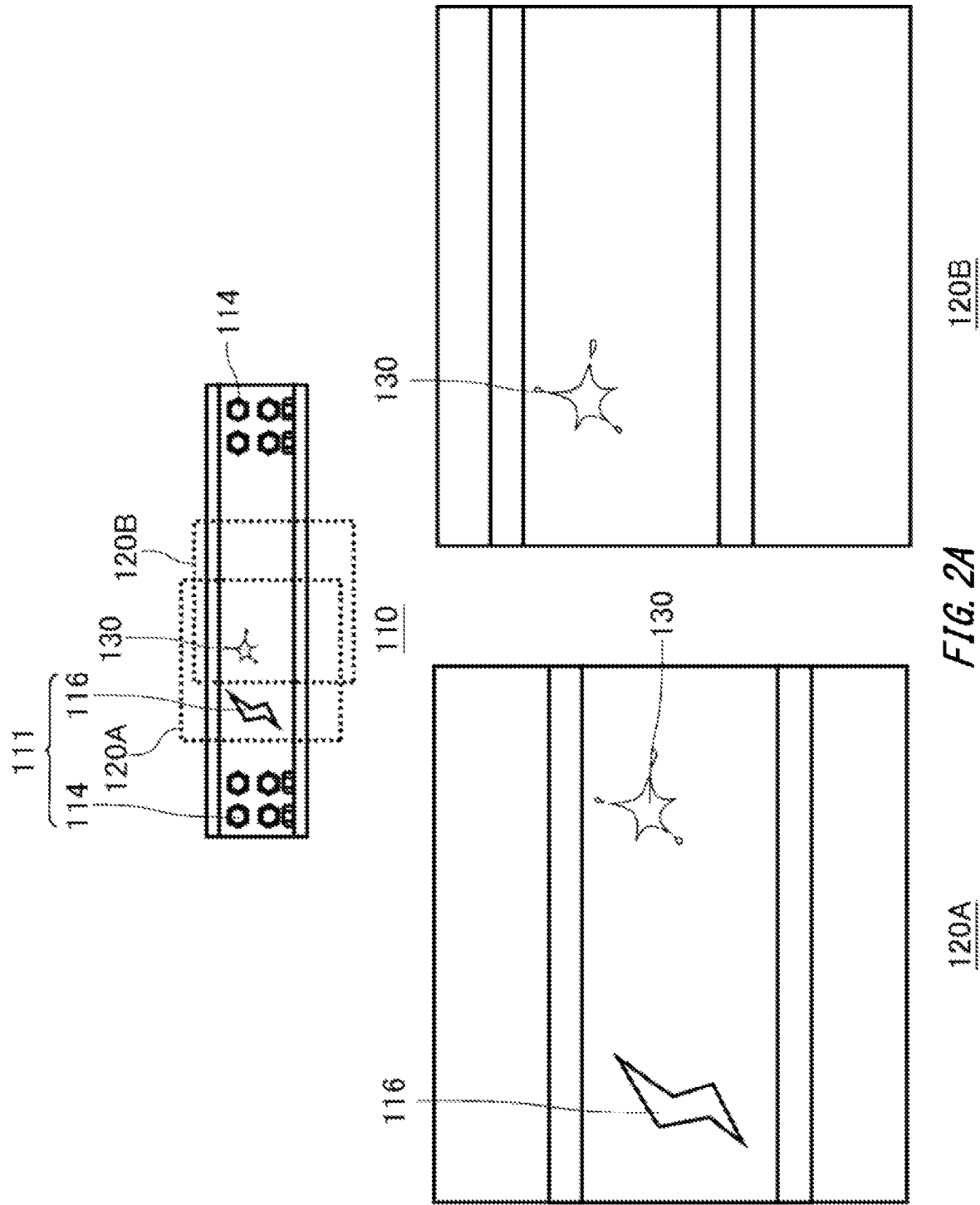
FIG. 2A illustrates one example of an image superimposition process of the subject 110 using a sprayed symbol 130.

FIG. 2A illustrates one example of an image superimposition process of the subject 110 using a sprayed symbol 130. The subject 110 is a target to be captured by the camera 30.

The subject 110 has a feature 111. The feature 111 may be a target, such as a metal hardware 114 or a scratch 116, used as a marker such as a non-uniform shape, design, or color, or a combination thereof that the subject has.

In the present example, the discharge portion 50 sprays to the subject 110 the content that fills the container 60 in the container holding portion 40. The discharge portion 50 forms the sprayed symbol 130 on the surface of the subject 110.

The camera 30 captures the image of the region 120 including the sprayed symbol 130 on the subject 110. For the subject 110, the images of a region 120A and a region 120B are each captured for performing the image superimposition process.

The region 120A includes the scratch 116 and the sprayed symbol 130. On the other hand, the region 120B does not have the feature 111 such as the metal hardware 114 or the scratch 116. Therefore, the connectivity evaluation portion 90 may determine that the image superimposition process on the images of the region 120A and the region 120B is difficult without the sprayed symbol 130. Even in this case, the image superimposition process that smoothly connects the superimposed parts can be performed by using the sprayed symbol 130 as the reference point for the image superimposition process.

Figure 2B:
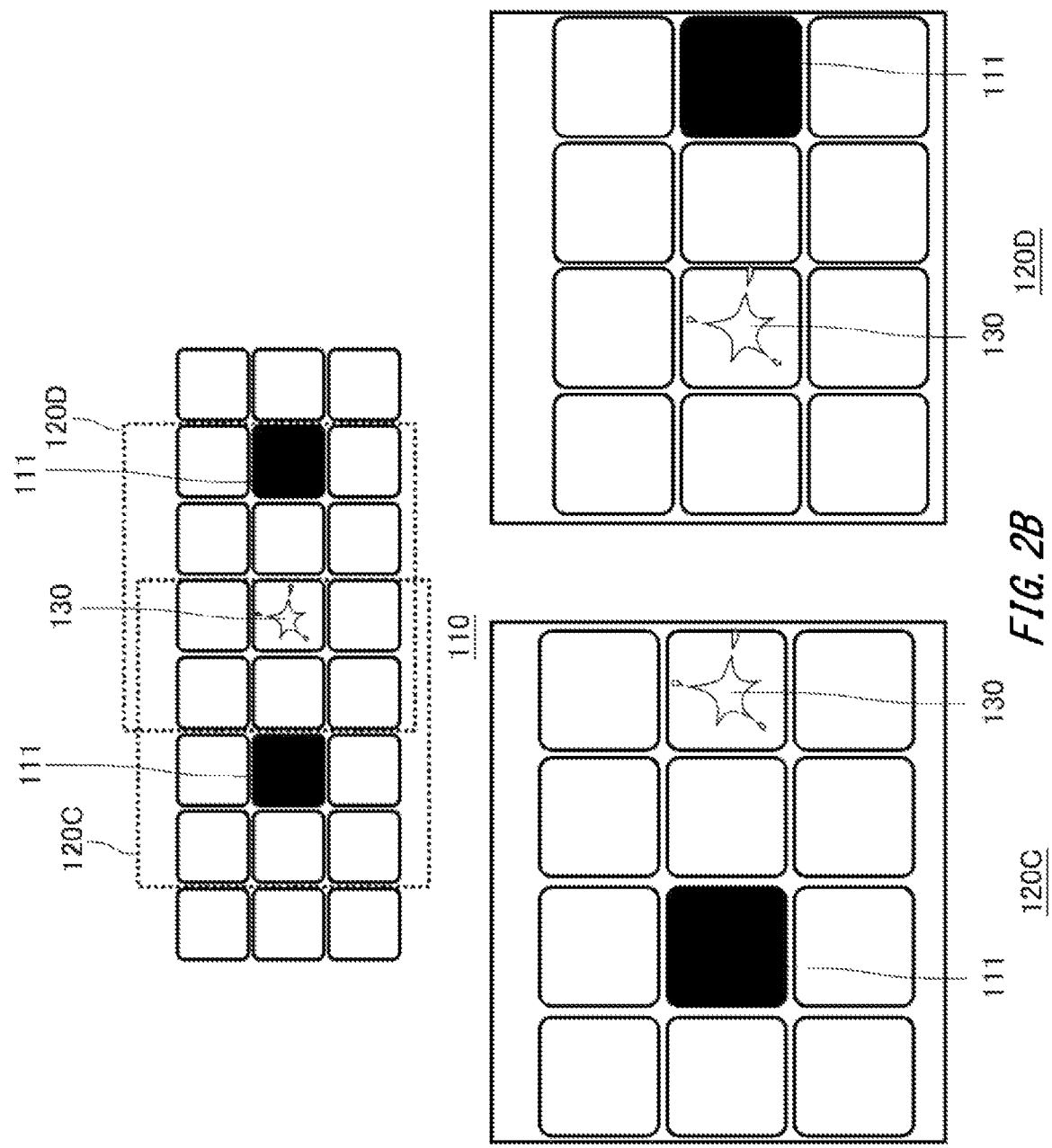
FIG. 2B is a diagram describing the image superimposition process using the sprayed symbol 130.

FIG. 2B is a diagram describing the image superimposition process using the sprayed symbol 130. The image in which the subject 110 is captured can be divided into tile-like regions 120.

The region 120C and the region 120D have the feature 111 in the tile-like surface. However, they do not have the feature 111 in the superimposed part between the region 120C and the region 120D. The superimposition process of images is easier when the superimposed part has a reference point. Therefore, the superimposition process on the images of the region 120C and the region 120D is made easier by providing the sprayed symbol 130 in the superimposed part of the images.

Figure 3:
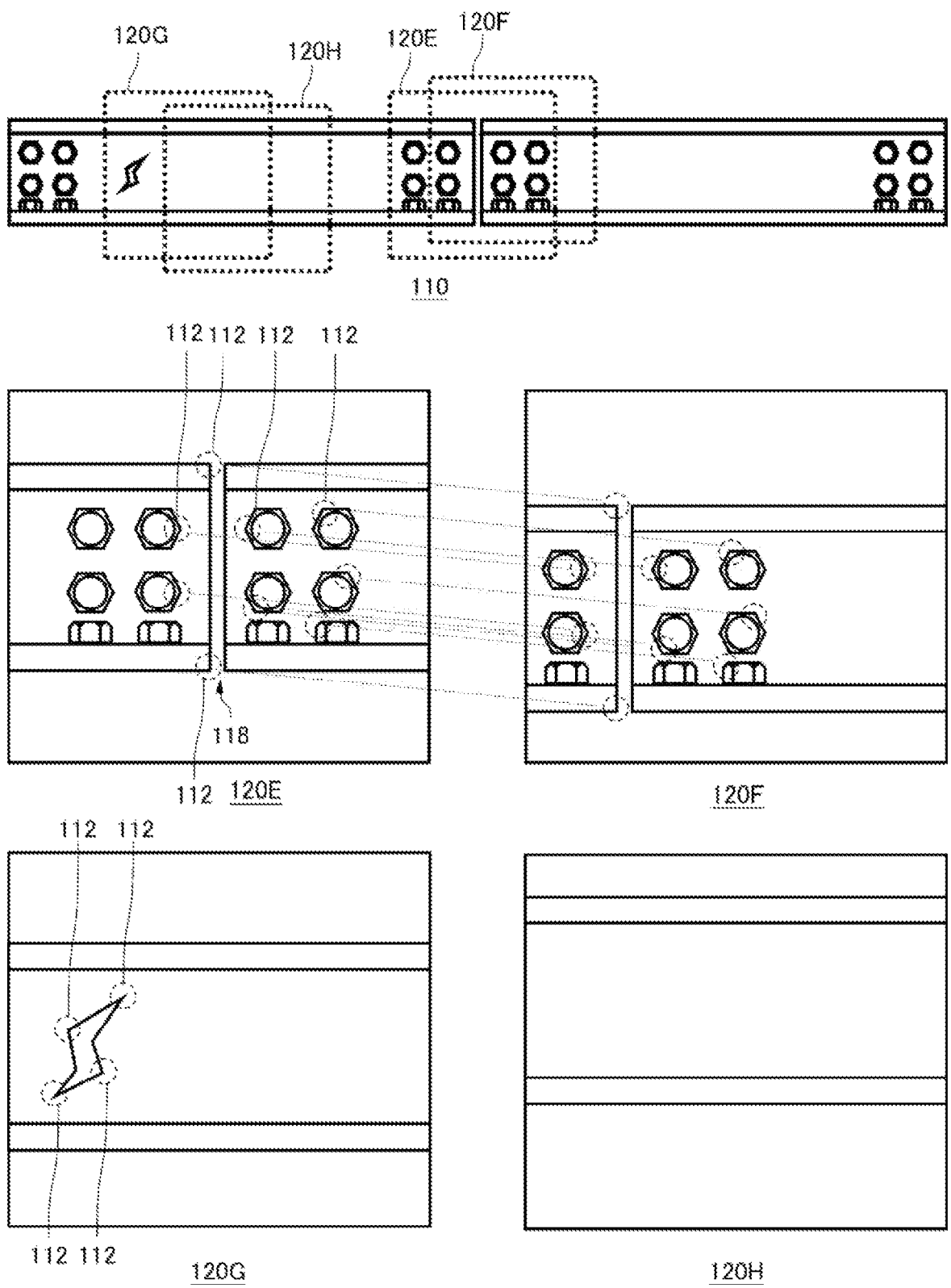
FIG. 3 is a diagram describing a feature point 112 in the image superimposition process of the subject 110.

FIG. 3 is a diagram describing a feature point 112 in the image superimposition process of the subject 110. The subject 110 has various features 111 on the surface. The superimposition process on the image of the region 120E and the image of the region 120F and the superimposition process on the image of the region 120G and the image of the region 120H are performed.

In the present example, the connectivity evaluation portion 90 performs the extraction process of the feature points 112 within the image captured by the camera 30. The feature points 112 may be a dot-like feature in spots to be used as a marker of the feature 111. For example, they may be a tip portion of the corner of the metal hardware 114 such as a nut, a edge of the transitioning part from a horizontal part to a tilt part, a sharp tip portion of the discontinuous boundary portion 118 of the subject 110, an apex part of the scratch 116, or a part in which the color discontinuously changes.

The connectivity evaluation portion 90 may evaluate the difficulty of the image superimposition process based on the quantity of the feature point obtained through the extraction process of the feature points 112. The region 120E and the region 120F have a large quantity of the feature points 112. In a case where the feature points 112 originally exist on the subject 110 in a large quantity, it may be determined that the image superimposition process on the image of the region 120E and the image of the region 120F can be easily performed by using the feature points 112 that originally exist instead of using the sprayed symbol 130.

The image of the region 120G and the image of the region 120H include the scratch 116 and the sprayed symbol 130 within the region 120G. On the other hand, the region 120H does not have the feature 111. Therefore, the connectivity evaluation portion 90 may determine that the superimposition process of the image of the region 120A and the image of the region 120B is difficult without the sprayed symbol 130. Even in this case, the image superimposition process that smoothly connects the superimposed parts can be performed by using the sprayed symbol 130 as the reference point for the image superimposition process.

Figure 4A:
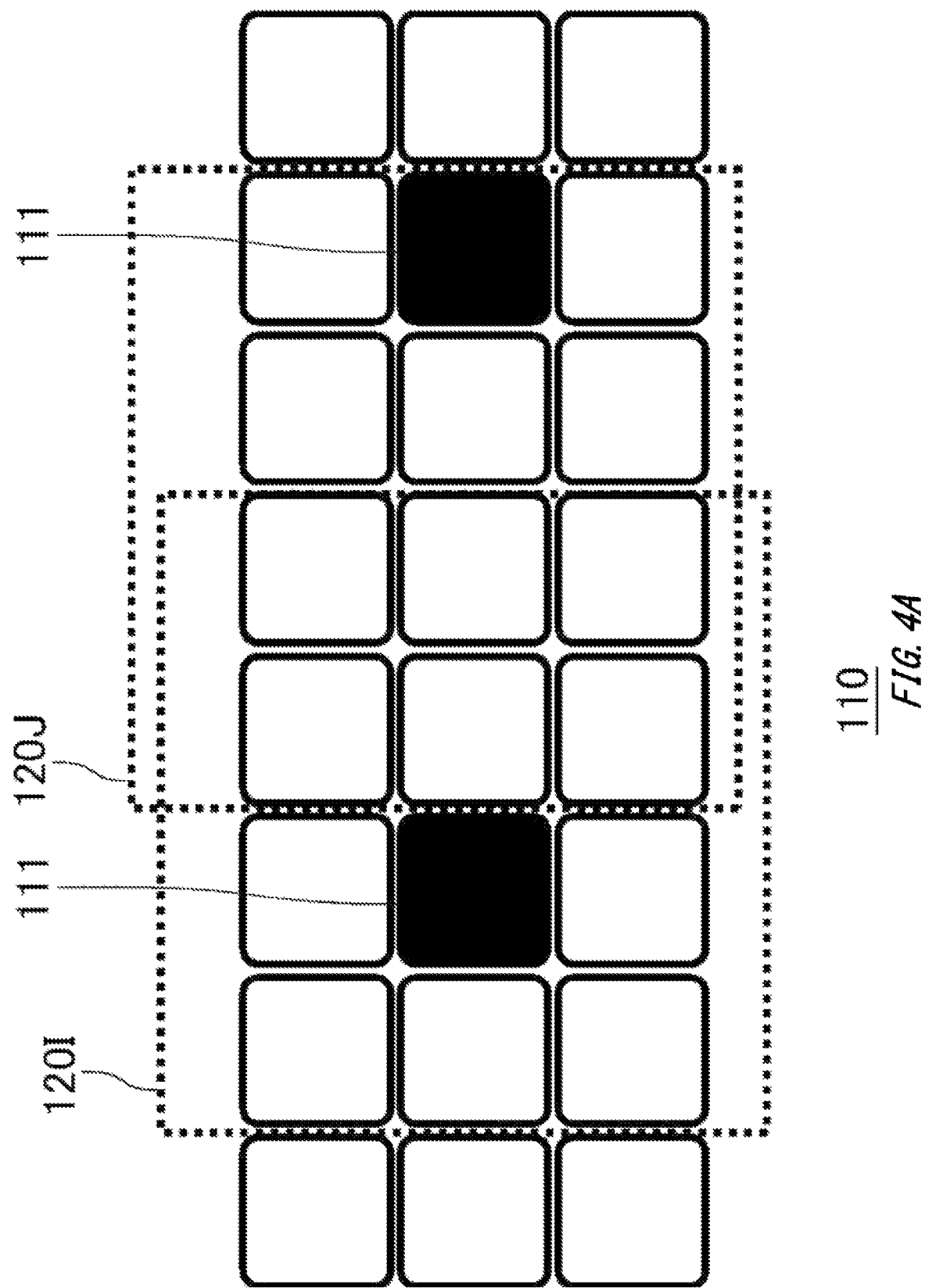
FIG. 4A illustrates the image superimposition process of the subject 110 in a comparative example.

FIG. 4A illustrates the image superimposition process of the subject 110 having a periodic repeated pattern on the surface in the comparative example. The image data processing system in the comparative example performs the image superimposition process on the region 120I and the region 120J of the subject 110.

FIG. 4B illustrates a successful example of the image superimposition process of the subject 110 having a periodic repeated pattern on the surface in the comparative example. The length of the superimposed part represents the length of the superimposed part in FIG. 4A. In this case, the image superimposition process on the region 120I and the region 120J of the subject 110 is appropriately performed.

FIG. 4C illustrates the unsuccessful example of the image superimposition process of the subject 110 having a periodic repeated pattern on the surface in the comparative example. In the present example, the superimposition process is performed with a wrong distance between the features 111, and the length of the superimposed part is shorter than that of the original superimposed part in FIG. 4A.

The connectivity evaluation portion 90 may sense whether there is a periodic repeated pattern. The connectivity evaluation portion may evaluate the difficulty based on the sensing result. As in the comparative example, the subject 110 may have a design of a constant pattern on the surface. Such a case may cause an unsuccessful image superimposition process as in the case of FIG. 4C, even in a case where a sufficient number of the feature points 112 can be extracted from the subject 110.

The image superimposition processing portion 95 may determine that, in a case where the subject 110 includes a periodic pattern, the image superimposition process on the image of the subject 110 is difficult. For example, in a case where the subject 110 is a tile surface or a brick surface, it is determined that the image superimposition process is difficult. As another example, in a case where a paint decoration such as a polka dot design or a mesh design is made, it is also determined that the image superimposition process is difficult.

The connectivity evaluation portion 90 may sense whether there is a periodic repeated pattern based on the self-connectivity in a case where the image of a single region is repeatedly replicated to be connected. For example, the region 120I can self-connect a plurality of the images of 120I itself through the left part of the region and the right part of the region, and it can be evaluated that the image superimposition process is difficult. In other words, in the region 120I, in a case where the replication of itself is self-connected at the both opposite end portions, that is, at the left part of the region and the right part of the region, the pattern connected to the left part is similar to the pattern connected to the right part. Such a similarity makes it difficult to perform the image superimposition process that accurately reflects the distance between the features 111, and the like.

Because the comparative example has no reference point of the image superimposition process such as the sprayed symbol 130, in a case where a subject is uniform and has few features, the length of the superimposed part may be wrongly evaluated, making it impossible to perform an appropriate superimposition process. On the other hand, because the example embodiment has the sprayed symbol 130 as the reference point of the image superimposition process, even in a case where the subject 110 that has a periodic repeated pattern, the length and position of the superimposed part can be accurately evaluated.

Figure 5A:
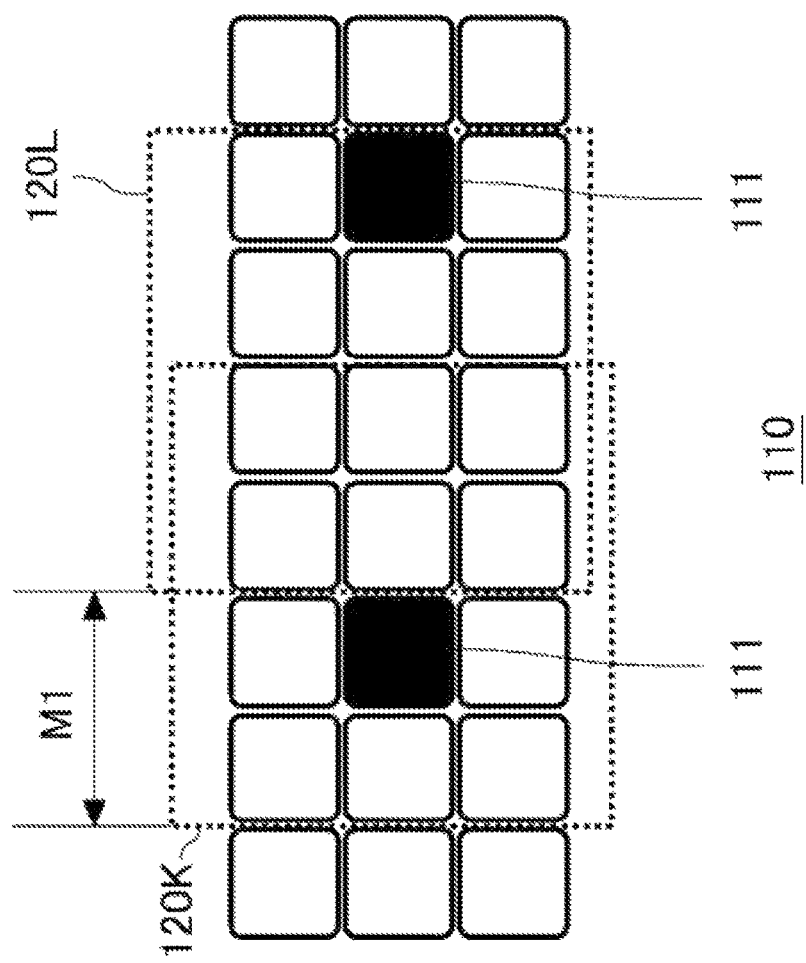
FIG. 5A is a diagram describing the evaluation of the difficulty of the image superimposition process based on the moving distance of the unmanned aerial vehicle 100.
Figure 5A:
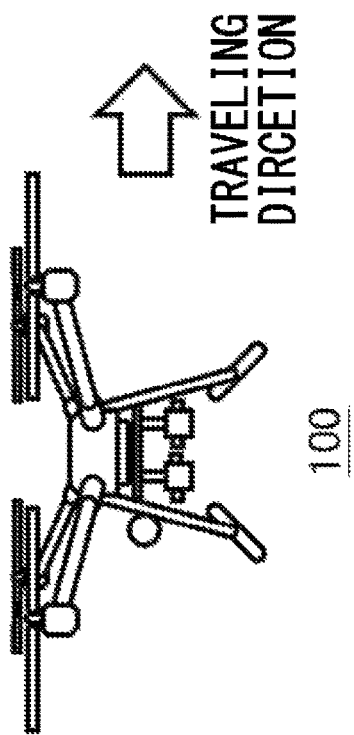

FIG. 5A is a diagram describing the evaluation of the difficulty of the image superimposition process based on the moving distance of the unmanned aerial vehicle 100. The connectivity evaluation portion 90 may sense the moving amount M of the unmanned aerial vehicle 100. The connectivity evaluation portion 90 may evaluate the difficulty of the image superimposition process based on the comparison between the moving amount M1 acquired from the position information of the unmanned aerial vehicle 100 and the moving amount M2 or M3 of the unmanned aerial vehicle 100 obtained from the attempt result of the image superimposition process described below.

As one example, the unmanned aerial vehicle 100 records the position information of the unmanned aerial vehicle when capturing the image. The connectivity evaluation portion 90 may use the amount of change in the position information recorded on the image as the moving amount M1 of the unmanned aerial vehicle 100. For example, the amount of change in the position information between the position information of the unmanned aerial vehicle 100 recorded on the image in which the region 120K in FIG. 5A is shot and the position information of the unmanned aerial vehicle 100 recorded on the image in which the region 120L is shot is the moving amount M1 of the unmanned aerial vehicle 100.

As another example, the position information of the unmanned aerial vehicle 100 may be acquired by a position information acquisition portion included in the unmanned aerial vehicle 100. The position information acquisition portion can use, for example, the global positioning system (GPS) and the real time kinematic (RTK).

Furthermore, the moving amount M2 or M3 of the unmanned aerial vehicle 100 is calculated from the moving amount of the image. The scale of the captured image can be calculated from the angle of view of the camera 30 used for capturing and the distance between the subject 110 and the unmanned aerial vehicle 100. Therefore, in two images of the region 120 each captured while moving such that the region 120K and the region 120L has a superimposed part, the moving amount M2 or M3 of the unmanned aerial vehicle 100 can be calculated from the moving amount of the image excluding the superimposed part.

The connectivity evaluation portion 90 can evaluate the attempt result of the image superimposition process by comparing the moving amount M1 acquired from the position information of the unmanned aerial vehicle 100 with the moving amount M2 or M3 of the unmanned aerial vehicle 100 calculated from the moving amount of the image in the attempt result of the image superimposition process. The connectivity evaluation portion 90 evaluates that the image superimposition process is difficult in a case where the difference between the moving amount M1 acquired from the position information of the unmanned aerial vehicle 100 and the moving amount M2 or M3 of the unmanned aerial vehicle 100 calculated from the moving amount of the image is higher than a predetermined threshold value.

FIG. 5B illustrates an example in which the image superimposition process is determined to be easy based on the moving distance of the unmanned aerial vehicle 100. In the present example, the moving amount M2 of the unmanned aerial vehicle 100 calculated from the attempt result of the image superimposition process is equal to the moving amount M1 acquired from the actual position information of the unmanned aerial vehicle 100 in FIG. 5A. The connectivity evaluation portion 90 can evaluate that the image superimposition process is easy based on the attempt result being successful.

Figure 5C:
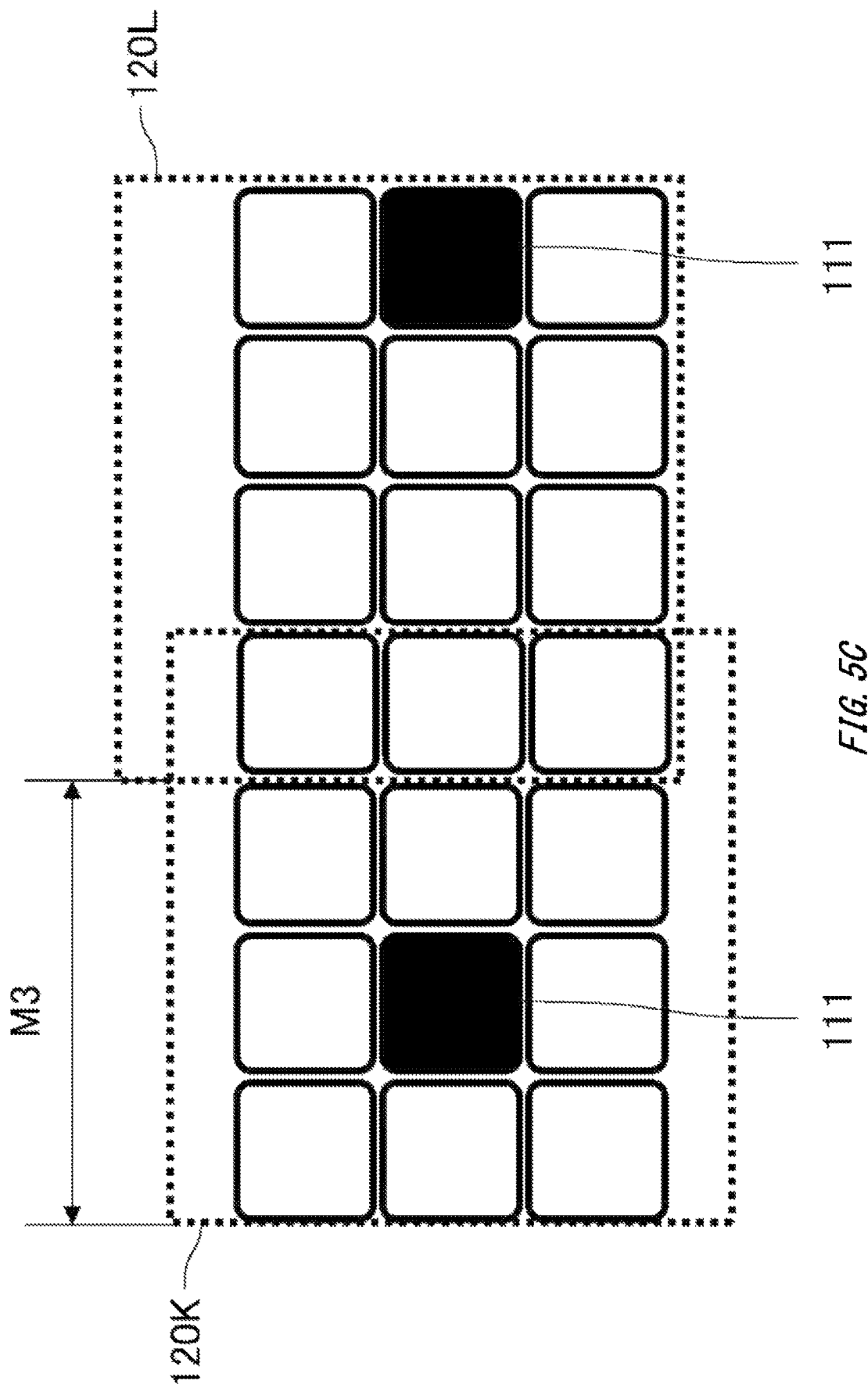
FIG. 5C illustrates an example in which the image superimposition process is determined to be difficult based on the moving distance of the unmanned aerial vehicle 100.

FIG. 5C illustrates an example in which the image superimposition process is determined to be difficult based on the moving distance of the unmanned aerial vehicle 100. In the present example, the moving amount M2 of the unmanned aerial vehicle 100 calculated from the attempt result of the image superimposition process is larger the moving amount M1 acquired from the actual position information of the unmanned aerial vehicle in FIG. 5A. In the present example, the connectivity evaluation portion 90 determines that the attempt of the image superimposition process has been unsuccessful. The connectivity evaluation portion 90 can evaluate that the image superimposition process is difficult based on the attempt result being unsuccessful.

Figure 6:
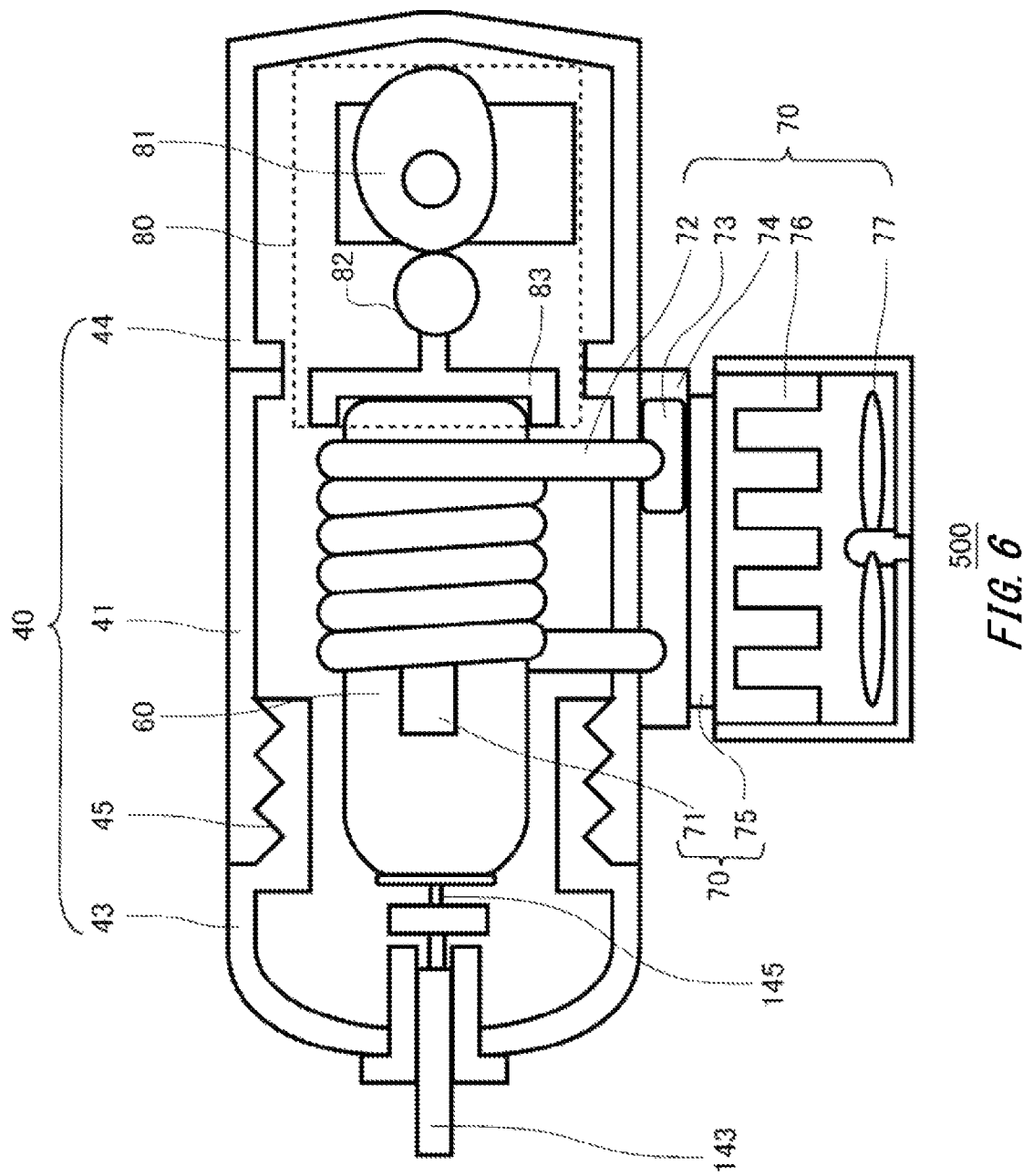
FIG. 6 illustrates one example of the configuration of the discharge apparatus 500.

FIG. 6 illustrates one example of the configuration of the discharge apparatus 500. FIG. 3 illustrates a cross-sectional view of the discharge apparatus 500. The discharge apparatus 500 has the container holding portion 40 for holding the container 60, the temperature adjustment apparatus 70 for adjusting the temperature of the container and the content, and the discharge driving portion 80 for controlling the discharge from the container 60.

The body 41 holds the container 60. The container holding portion 40 in the present example includes the body 41, the first end cover portion 43, and the second end cover portion 44. The body 41 has a cylindrical shape that has a larger diameter than the container 60. The body 41 in the present example is sandwiched between the first end cover portion 43 and the second end cover portion 44.

The first end cover portion 43 covers one of the end portions of the body 41. The first end cover portion 43 in the present example covers the end portion at the injection side of the container 60. The first end cover portion 43 is detachably screwed to the body 41 via the screw portion 45.

The first end cover portion 43 in the present example has a dome-shaped cover body. The diameter of first end cover portion 43 gradually decreases toward the tip in consideration of the aerodynamic characteristics. The first end cover portion 43 has a cone-shaped curved surface with a blunt tip or a dome-shaped curved surface. Such a shape with good aerodynamic characteristics reduces the influence of side wind and can stabilize the flight.

The second end cover portion 44 covers the end portion of the body 41 other than the end portion covered by the first end cover portion 43. The second end cover portion 44 in the present example covers the end portion of the container 60 that is at the opposite side to the injection side. The second end cover portion 44 is configured to be integrated with the body 41. Furthermore, the second end cover portion 44 may be detachably provided on the body 41.

The temperature adjustment apparatus 70 can adjust the temperature of the content of the container 60 to a temperature different from that of the surface temperature of the subject. The temperature adjustment apparatus 70 in the present example has a temperature sensor 71, a pipe 72, a pump 73, a reservoir 74, a peltier device 75, a heat sink 76, and a fan 77.

The temperature sensor 71 measures the temperature of the container 60 and the content. The temperature sensor 71 to be selected may include a sensor that provides a desired temperature range and sensitivity depending on the environment and the content, such as a thermistor, a temperature sensing diode, or a thermocouple.

The pipe 72 is made of elastic material that has a high thermal conductivity. As one example, the pipes 72 are provided as a cylindrical structure such that the pipes 72 are in fluid communication with each other. Fluid used as heat medium that conveys heat flows through the pipe 72. As one example, coolant for cooling including Long Life Coolant (LLC) and the like flows through the pipe 72. However, the heat medium flowing through the pipe 72 may be another medium.

The pump 73 circulates the heat medium from the reservoir 74 into one end of the pipe 72 and further from the other end of the pipe 72 into the reservoir 74. The pump 73 may be provided outside or inside the reservoir 74.

The reservoir 74 is a container that contains the heat medium. The reservoir 74 in the present example is provided outside the container holding portion 40. However, the reservoir 74 may also be provided inside the container holding portion 40. In a case where the reservoir 74 is provided outside the container holding portion 40, the reservoir 74 may be provided with a heat insulating member so that the heat medium that has been heated or cooled is not affected by the temperature of the outside environment.

The peltier device 75 is an element that absorbs or generates heat when direct current is applied thereto. The peltier device 75 heats or cools the heat medium within the reservoir 74. The peltier device 75 has polarity and can switch between cooling and heating by reversing the polarity of the applied voltage.

The heat sink 76 may dissipate the generated heat toward the fan 77 in order to prevent the overheating of the element that operates electrically such as the peltier device 75 and the pump 73. The fan 77 may cool the heat sink 76.

The discharge driving portion 80 discharges the content from the container 60. The discharge driving portion 80 is housed in the second end cover portion 44 located at the bottom side of the container 60. The second end cover portion 44 serves as a housing of the discharge driving portion 80. The discharge driving portion 80 includes a cam 81, a cam follower 82, and a movable plate 83. Since the discharge driving portion 80 is provided on the container holding portion 40, the discharge driving portion 80 does not have to be exchanged when the container 60 is exchanged.

The cam 81 is driven to be rotated by a driving source. In one example, a motor is used as the driving source. The cam 81 has a structure in which the distance between the outer circumference and the rotational center varies. It is noted that, in the illustrated example, the shape of the cam 81 is exaggerated. The cam 81 contacts the cam follower 82 at the outer circumference.

The cam follower 82 is provided between the cam 81 and the movable plate 83. The cam follower 82 is connected to the cam 81 and the movable plate 83, and transmits the rotational movement of the cam 81 to the movable plate 83 as a linear movement.

The movable plate 83 is provided so as to contact the bottom plane of the container 60, and control the opening and closing of the valve of the container 60. The movable plate 83 is moved forward and backward by the cam follower 82. For example, in a case where the distance between the rotational center of the cam 81 and the contact region of the cam 81 that the cam follower 82 abuts is short, the movable plate 83 moves backward with respect to the container 60 and the valve of the container 60 closes. On the other hand, in a case where the distance between the rotational center of the cam 81 and the contact region of the cam 81 where the cam follower 82 abuts is long, the movable plate 83 moves with respect to toward the container 60 and the valve of the container 60 opens.

It is noted that the discharge driving portion 80 has a configuration in which the cam mechanism converts the rotational movement of the motor into the linear movement, but the mechanism is not limited to the cam mechanism. For example, the mechanism of the discharge driving portion 80 may be a feed screw mechanism, a rack and pinion, or the like, as long as it is a mechanism that converts the rotational movement of the motor into the linear movement. Furthermore, a linear motor for linear driving, an electromagnetic solenoid, or the like may be included as the driving source, instead of the rotational motor.

The discharge driving portion 80 may be electrically controlled by a program and the like. Whether to discharge the content or the amount of the content to be discharged may be controlled through the control by the discharge driving portion 80. Furthermore, in a case where the unmanned aerial vehicle 100 incorporates a plurality of containers 60, the type of the content to be discharged may be selected. As one example, the electricity to the discharge driving portion 80 is stopped so that the discharge of the content is locked.

The stem 145 is provided on the container 60. The stem 145 is pressed by the actuator 143 so that the content is discharged from the container 60. The actuator 143 has a flow channel depending on the discharge direction and the discharge manner. As one example, the actuator 143 atomizes and discharges the content.

It is noted that in the present example the container 60 is directly incorporated in the container holding portion 40, but the container 60 may be housed by a housing member and the housing member may be incorporated in the container holding portion 40. Since the housing member protects the container 60 from a shock, the safety during an accident increases.

Because the container 60 in the present example is also an aerosol container, an empty container 60 can be easily exchanged by simply incorporating a new container 60.

Furthermore, the content is unlikely to contact a human body, which increases the safety during an exchange.

Figure 7:
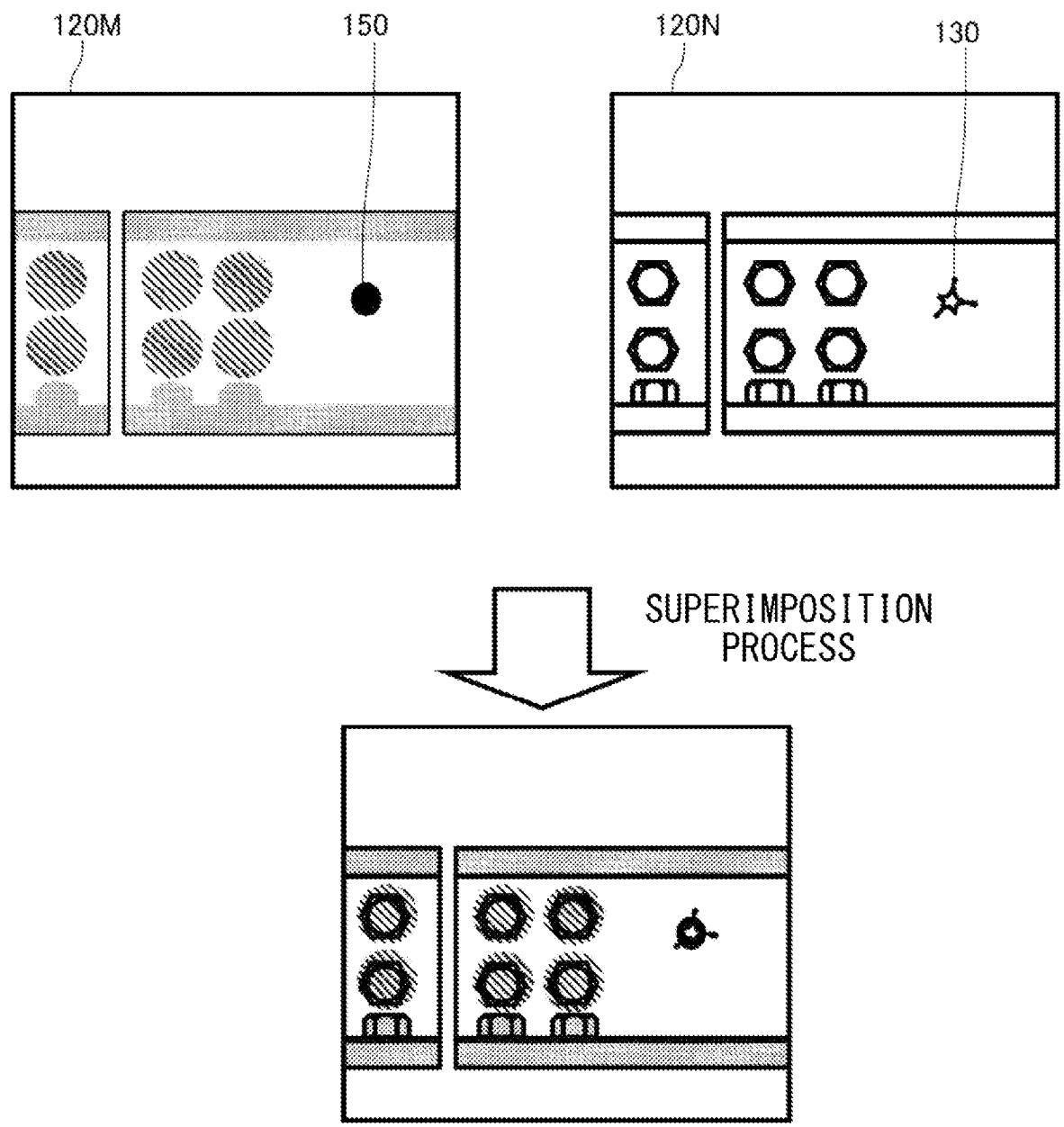
FIG. 7 is one example of the image superimposition process on the thermal image of the subject 110 and the visible light image of the subject 110.

FIG. 7 is one example of the image superimposition process on the thermal image of the subject 110 and the visible light image of the subject 110. The camera 30 may provide a visible light image of the subject 110 using the visible light camera 32 and provide a thermal image of the subject 110 using the infrared camera 34.

The thermal image of the region 120M includes a different temperature area 150 as a reference point for the image superimposition process. The different temperature area 150 is formed by the content of the container 60, and has a temperature different from those of other parts of the subject 110. The thermal image of the region 120 is provided as an image of a region including the different temperature area 150 captured by the infrared camera 34.

The image of the region 120N is captured as an image of the region 120N including the sprayed symbol 130 by the visible light camera 32. On the other hand, the sprayed symbol 130 and the different temperature area 150 may be simultaneously formed by the discharge portion 50 that discharges the content. However, the sprayed symbol 130 and the different temperature area 150 may be formed at different timings.

As one example, the content may have a vaporizable component. The different temperature area 150 may be formed by the vaporization heat generated when the content discharged onto the subject 110 evaporates. As another example, in a case where there are a plurality of containers 60 and contents, the discharge portion 50 can spray the sprayed symbol 130 using chemically stable substance. The different temperature area 150 may be formed by spraying another chemical substance onto the sprayed symbol 130 at another time so that these substances react with each other.

In the image superimposition process of a thermal image and a visible light image, the image superimposition processing portion 95 may use the different temperature area 150 and the sprayed symbol 130 as the reference point in the image superimposition process. In the present example, for the image of the region 120M and the image of the region 120N, each image is synthesized by using the different temperature area 150 and the sprayed symbol 130 as the reference points for the alignment of the image.

As one example, in a case where the superimposition process of the thermal image and the visible light image are performed, after the image data whose positions are matched by performing the image superimposition process are stored, the image to be actually displayed to the user may be either of the images. In other words, the thermal image display and the visible light image display of the same position may be selectively switched to be provided when they are provided to the user.

Figure 8:
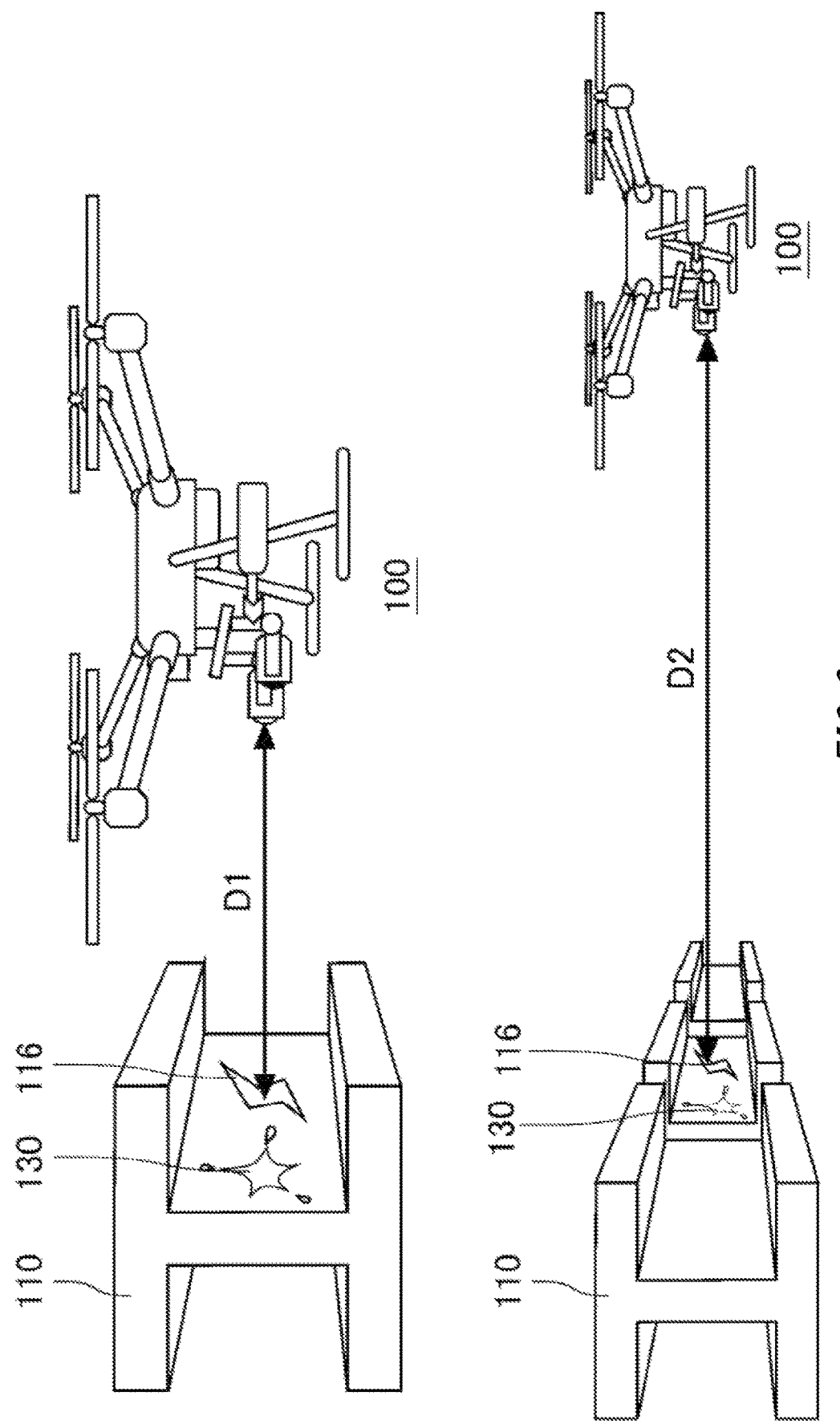
FIG. 8 is one example of the self-control of the unmanned aerial vehicle 100.

FIG. 8 is one example of self-control of the unmanned aerial vehicle 100. The capturing of the unmanned aerial vehicle 100 may be performed through self-control.

The control of the unmanned aerial vehicle 100 in the present example is one example of the control performed in a case where the subject 110 has the scratch 116. The unmanned aerial vehicle 100 finds the scratch 116 based on the magnitude, depth or the like of unevenness on the surface of the subject 110. The unmanned aerial vehicle 100 that found the scratch 116 on the surface of the subject 110 uses the discharge portion 50 to mark the surroundings of the scratch 116 using the sprayed symbol 130 so that the scratch 116 can be easily found again.

Furthermore, the unmanned aerial vehicle 100 moves to the position that is at a predetermined distance D1 away from the sprayed symbol 130. The distance D1 is one example of the first distance. The unmanned aerial vehicle 100 uses the camera 30 at the distance D1 to capture the subject 110 to include the sprayed symbol 130 and the scratch 116.

The unmanned aerial vehicle 100 then moves to the position at a distance D2, which is farther than the distance D1, away from the sprayed symbol 130. The distance D2 is one example of a second distance. The unmanned aerial vehicle 100 also uses the camera 30 at the distance D2 to capture the subject 110 to include the sprayed symbol 130 and the scratch 116. In other words, the shooting at the distance D1 and the distance D2 corresponds to the process to acquire the magnified image and the wide angle image of the scratch 116. The foregoing process is automatically performed so that the defect such as the scratch 116 on the subject 110 is automatically found and the detail image of the surroundings of the defect can be captured. In other words, the system that can automatically detect the defect on the subject 110 is implemented.

Figure 9A:
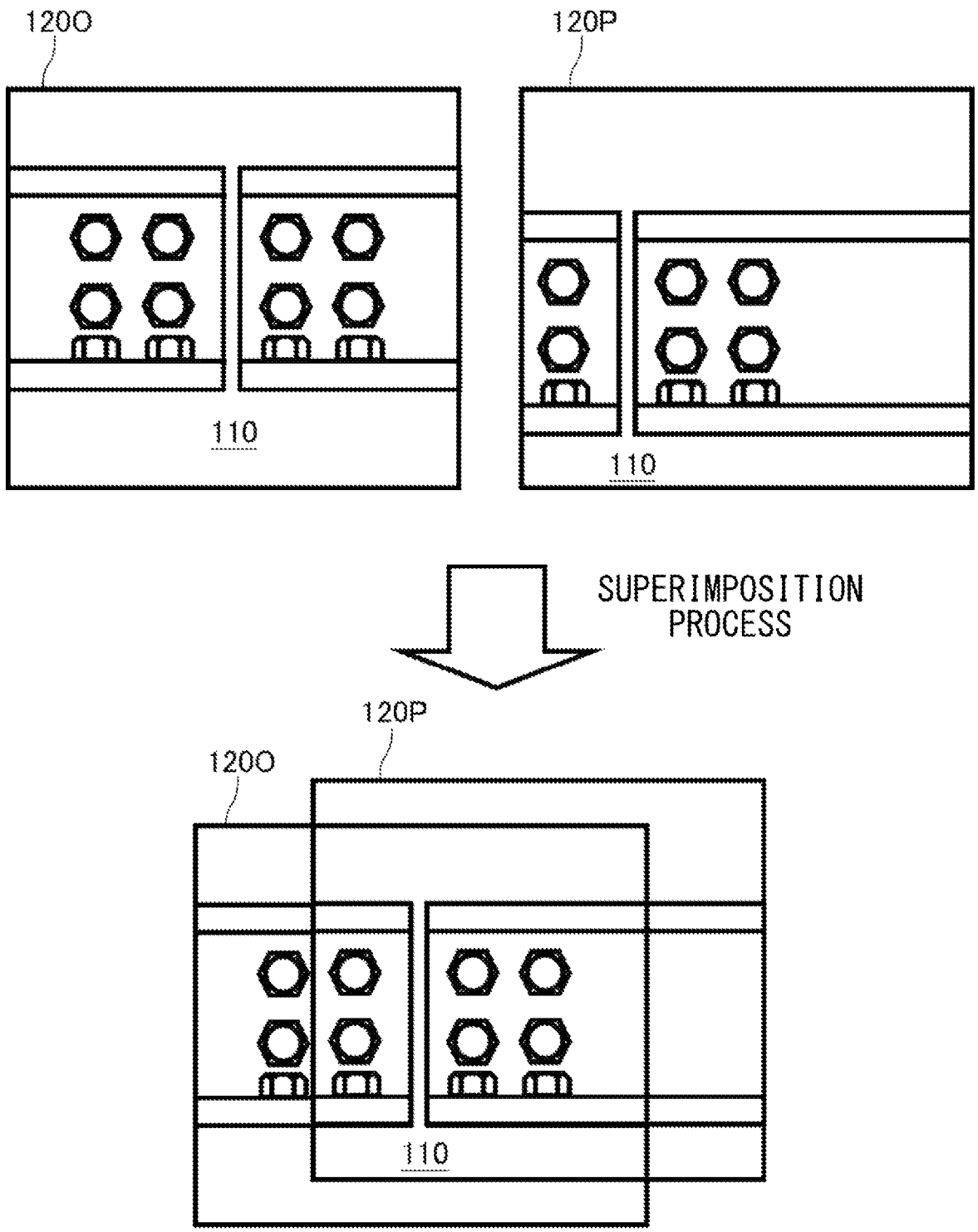
FIG. 9A is one example of the image superimposition process of the subject 110.

FIG. 9A is one example of the image superimposition process of the subject 110. In the present example, the unmanned aerial vehicle 100 moves toward the subject 110 in the horizontal direction and shoots two regions 120O and 120P from different perspectives.

In the image superimposition process in the present example, a connecting process is performed on the image of the region 120O and the image of the region 120P so that the image of the subject 110 with a wider range is provided. The whole image of the subject 110 can be provided by connecting the images of the subject 110 with a wide range.

Figure 9B:
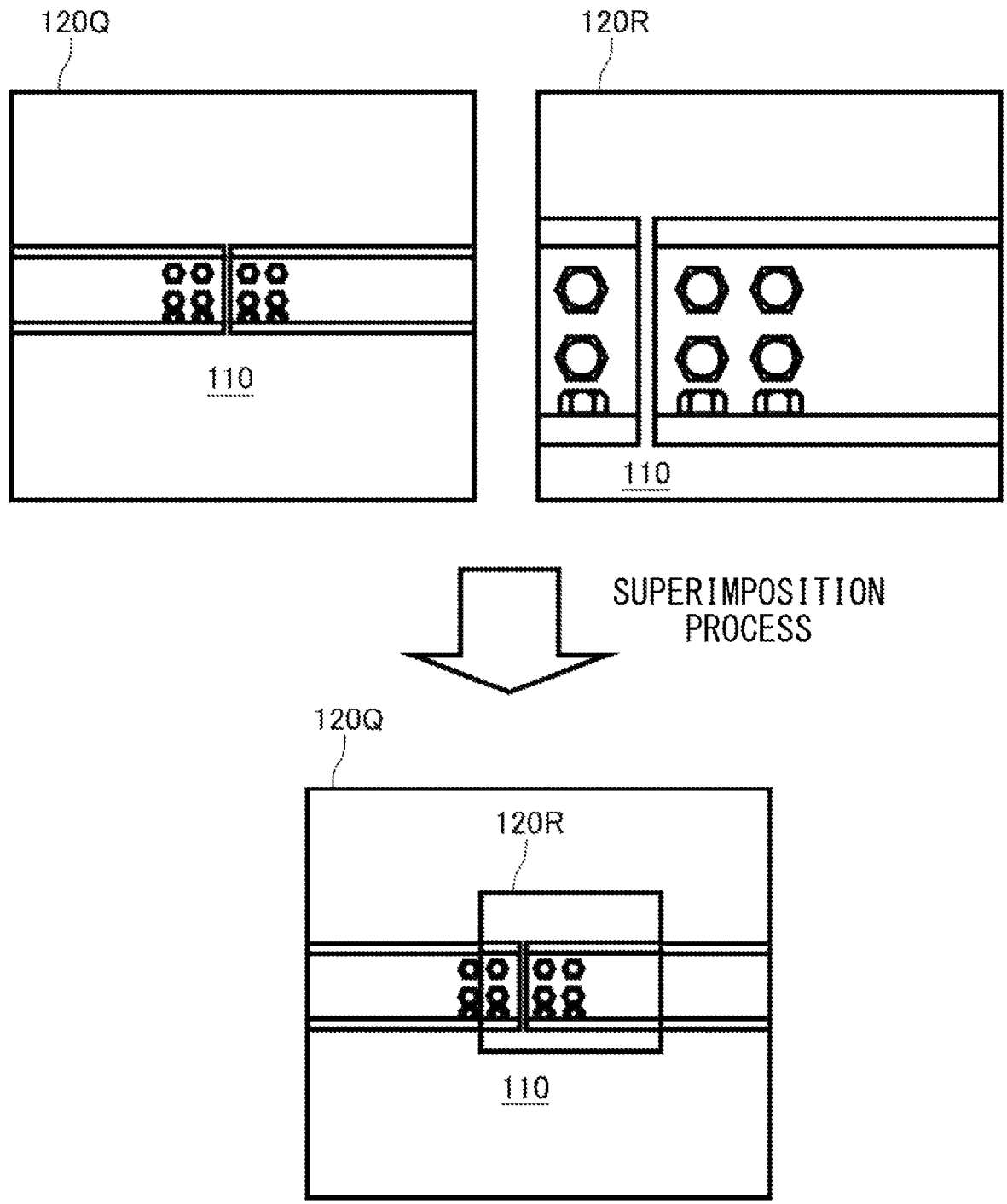
FIG. 9B is another example of the image superimposition process of the subject 110.

FIG. 9B is another example of the image superimposition process of the subject 110. In the present example, the unmanned aerial vehicle 100 captures the image of two regions 120Q and 120R by changing the distance from the subject 110.

In the present example, the image superimposition process includes the synthetic process on the images in which the image of the region 120Q shot with a wide angle and the image of the region 120R captured at a proximity are synthesized. The optical camera has a depth of field showing the depth in which a focus distance matches during capturing. In other words, for each distance, the depth that enables focusing on the target being captured depends on the depth of field. A high resolution image from a wide angle image to a proximity image in which a wide range is focused can be synthesized by capturing a plurality of images with varying distances from the subject 110 and performing the synthetic process of the image. In this way, even when the perspective is changed three-dimensionally, focused high resolution three dimensional image data can be provided.

Figure 10A:
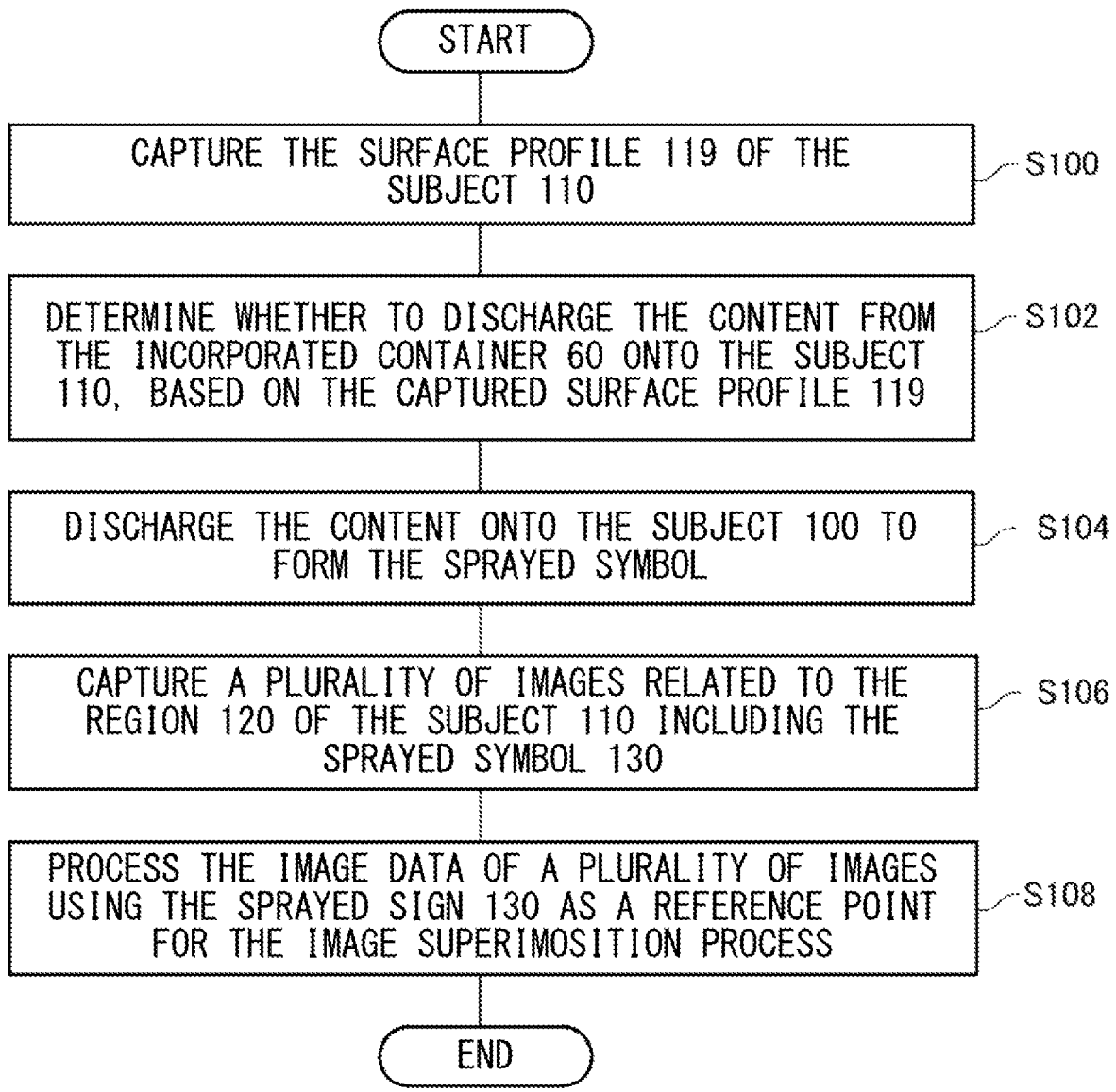
FIG. 10A is one example of the flow diagram of the image data processing method 300.

FIG. 10A is one example of the flow diagram of the image data processing method 300. The image data processing method 300 in the present example includes step S100 to S108.

In S100, the surface profile 119 of the subject 110 is captured. In S102, whether to discharge the content from the container incorporated in the unmanned aerial vehicle 100 onto the subject 110 is determined based on the captured surface profile 119. In S104, the content is discharged from the container incorporated in the unmanned aerial vehicle 100 onto the subject 110 so that the sprayed symbol 130 is formed. The processes of S102 and S104 may be automatically performed by a program and the like. In this way, the image superimposition process on the subject 110 can be automatically made easier. In S106, a plurality of images related to the region 120 of the subject 110 including the sprayed symbol 130 is captured. In S108, the image data of a plurality of images is processed using the sprayed symbol 130 as a reference point for the image superimposition process.

Figure 10B:
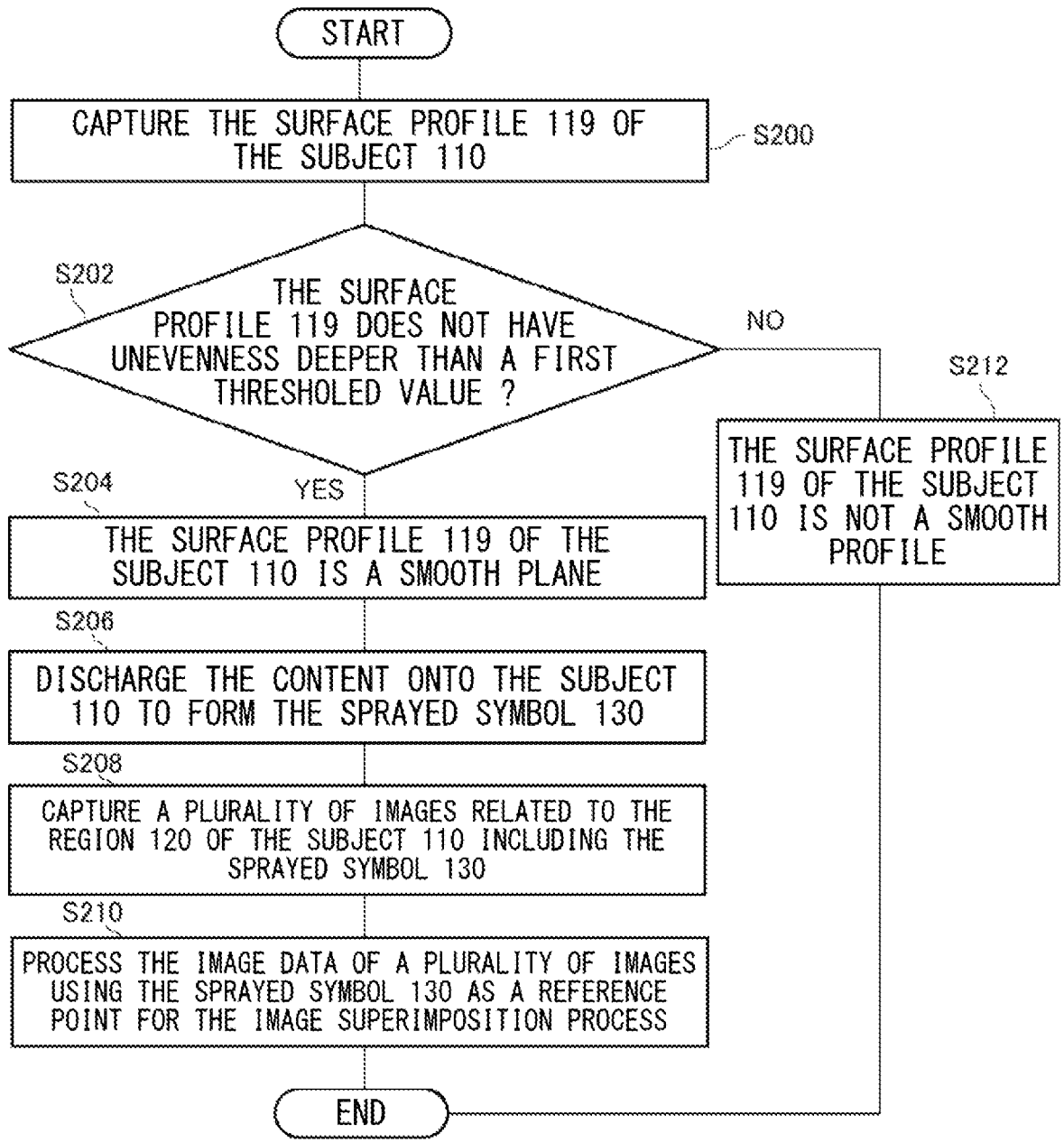
FIG. 10B is another example of the flow diagram of the image data processing method 300.

FIG. 10B is another example of the flow diagram of the image data processing method 300. The image data processing method 300 in the present example includes step S200 to S212.

In S200, the surface profile 119 of the subject 110 is captured. In S202, whether the surface profile 119 of the subject 110 has unevenness deeper higher than a predetermined first threshold value is determined. In a case where the surface profile 119 of the subject 110 does not have unevenness deeper than the first threshold value, in S204, it is determined that the surface profile 119 is a smooth surface. If the surface profile 119 is a smooth surface, it is likely to be a plane that has few feature points 112 such as the scratch 116. Furthermore, in S206, the content is discharged from the container incorporated in the unmanned aerial vehicle 100 onto the subject 110 so that the sprayed symbol 130 is formed. In S204, the sprayed symbol 130 is formed on the subject 110 that is determined to have few feature points 112 so that the target can be easier for the image superimposition process. For example, an automatic process can be implemented that causes a desired subject 110 to be a target that is easier for the image superimposition process by forming the sprayed symbol 130 for each constant area of the subject 110 or performing the process in the present example on the preset desired subject 110.

In S208 and S210, the image superimposition process is performed. In S208, a plurality of images related to the region 120 of the subject 110 including the sprayed symbol 130 is captured. In S210, the image data of a plurality of image is processed using the sprayed symbol 130 as a reference point for the image superimposition process. The process ends after the image data process.

On the other hand, in a case where the surface profile 119 of the subject 110 has unevenness deeper than the first threshold value, in S212, it is determined that the surface profile 119 is not a smooth surface. If the surface profile 119 is not determined to be a smooth surface, the process ends.

Figure 10C:
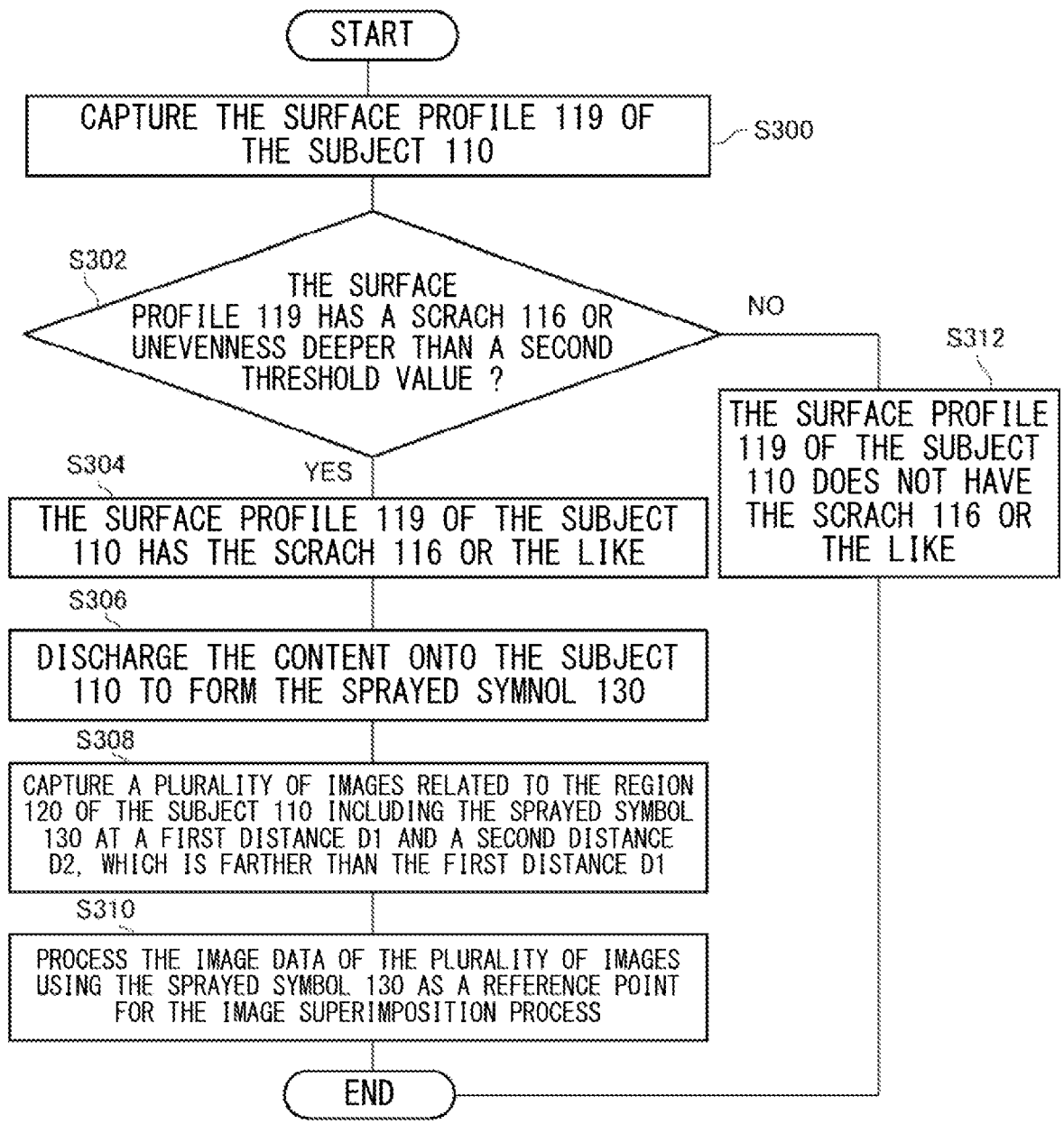
FIG. 10C is yet another example of the flow diagram of the image data processing method 300.

FIG. 10C is yet another example of the flow diagram of the image data processing method 300. The image data processing method 300 in the present example includes steps S300 to S312.

In S300, the surface profile 119 of the subject 110 is captured. In S302, it is determined whether the surface profile 119 of the subject 110 has a scratch or unevenness deeper than a predetermined second threshold value. If the surface profile 119 of the subject 110 does not have a scratch or unevenness deeper than the second threshold value, in S304, it is determined that the surface profile 119 of the subject 110 has the scratch 116 and the like. In other words, the process of S300 to S304 can be used as a structure defect diagnosis process to diagnose whether there is a defect and the like in the surface profile 119 of the subject 110. If it is determined that the surface profile 119 has the scratch 116 and the like, in S306, the content is discharged onto the surroundings of the scratch 116 and the like of the subject 110 to form the sprayed symbol 130. The sprayed symbol 130 can be used as a reference point for the image superimposition process and can also be used as a marker for the found scratch 116 and the like to be easily found again.

In S308, a plurality of images related to the region 120 of the subject 110 including the sprayed symbol 130 is captured at the first distance D1 and the second distance D2, which is farther than the first distance D1. In S308, the images of the scratch 116 and the sprayed symbol 130 are captured as a proximity image and a wide angle image so that the defect such as the scratch 116 on the subject 110 can be precisely captured. In S310, the image data of a plurality of images is processed by using the sprayed symbol 130 as a reference point for the image superimposition process. The process ends after the image data process.

On the other hand, if the surface profile 119 of the subject 110 does not have a scratch or unevenness deeper than the second threshold value, in S312, it is determined that the surface profile 119 does not have a scratch or unevenness. If it is determined that the surface profile 119 does not have a scratch or unevenness, the process ends. The process in the present example is automatically performed by a program so that an automated defect diagnosis method for the subject 110 can be implemented.

Figure 11:
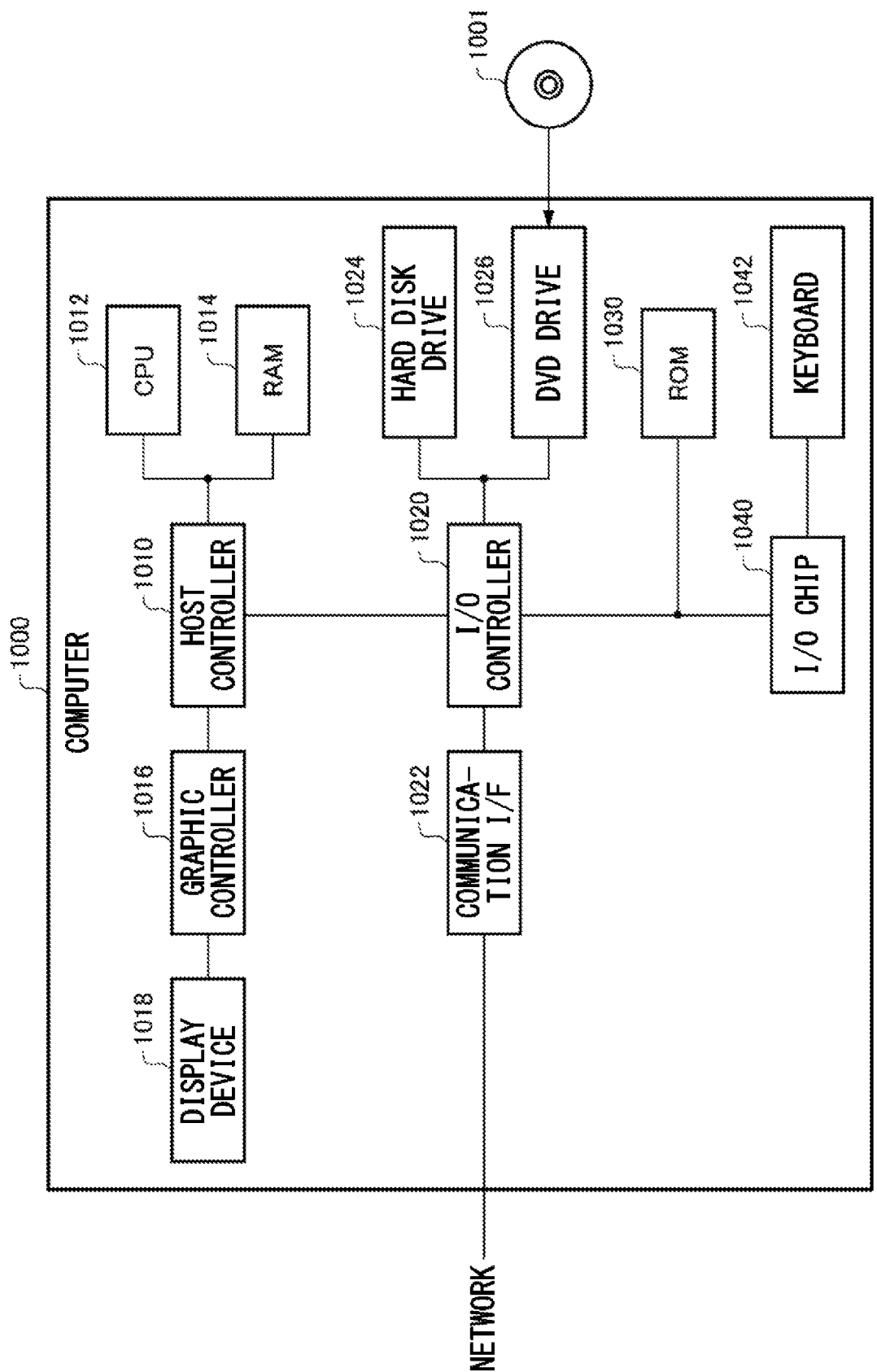
FIG. 11 illustrates one example of the hardware configuration of the computer 1000 that serves to implement the image data processing method 300.

FIG. 11 illustrates one example of the hardware configuration of the computer 1000 that serves to implement the image data processing method 300. Furthermore, a plurality of computers may cooperatively serve to implement the image data processing method 300.

The computer 1000 according to an example embodiment includes a CPU peripheral part including a CPU 1012, a RAM 1014, a graphics controller 1016, and a display device 1018, which are connected to each other by the host controller 1010; a communication interface 1022 connected to the host controller 1010 by the input/output controller 1020; an input/output unit including a hard disk drive 1024 and a DVD drive 1026; and a legacy input/output unit including a ROM 1030 connected to the input/output controller 1020, an input/output chip 1040, and a keyboard 1042 connected to the input/output chip.

The host controller 1010 connects the RAM 1014 to the CPU 1012 and the graphics controller 1016 that access the RAM 1014 at a high transfer rate. The CPU 1012 operates based on the program stored in the ROM 1030 and the RAM 1014 to perform the controls for each unit. The graphics controller 1016 acquires the image data generated by the CPU 1012 or the like on a frame buffer provided in the RAM 1014 and displays it on the display device 1018. Alternatively, the graphics controller 1016 may include therein a frame buffer that stores image data generated by the CPU 1012 or the like.

The input/output controller 1020 connects the host controller 1010 to the communication interface 1022, the hard disk drive 1024, and the DVD drive 1026 that are relatively high speed input/output apparatuses. The communication interface 1022 communicates with another apparatus via a network. The hard disk drive 1024 stores a program and data used by the CPU 1012 in the computer 1000. The DVD drive 1026 reads a program or data from the DVD-ROM 1001 and provides it to the hard disk drive 1024 via the RAM 1014.

Furthermore, ROM 1030 and the relatively low speed input/output apparatus of the input/output chip 1040 are also connected to the input/output controller 1020. The keyboard 1042 is one example of the input/output apparatus. The ROM 1030 stores a boot-program executed by the computer 1000 at the time of start-up, a program that is dependent on hardware of the computer 1000, and/or the like. The input/output chip 1040 connects various input/output apparatuses to an input/output controller 1020, for example, via a parallel port, a serial port, a keyboard port, a mouse port, and the like.

The program to be provided to the hard disk drive 1024 via the RAM 1014 is stored in a recording medium such as the the DVD-ROM 1001 or an IC card, and provided by a user. The program is read from the recording medium, installed on the hard disk drive 1024 within the computer 1000 via the RAM 1014, and executed in the CPU 1012. The program is installed on the computer 1000, and causes the computer 1000 to serve as each component for implementing the image data processing method 300, for example, each component of the image data processing system 200.

The information processing described in the program is read by the computer 1000 and serves as at least a part for the image data processing system 200 that is the specific means in which the software and the various hardware resources described above cooperate. Then, this specific means achieves the operation or process of the information depending on the intended use of the computer 1000 in the the present embodiment so that the image data processing system 200 that is unique depending on the intended use.

As one example, if communication is performed between the computer 1000 and an external device or the like, the CPU 1012 executes a communication program loaded on the RAM 1014, and instructs, based on the processing contents described in the communication program, the communication interface 1022 to perform communication processing. Under control of the CPU 1012, the communication interface 1022 reads out send data stored in a transmission buffer region or the like provided on a storage device such as the RAM 1014, the hard disk drive 1024, or the DVD-ROM 1001 to transmit the data to the network, or writes receive data received from the network into a reception buffer region or the like provided on the storage device. The computer 1000 may be implemented on the unmanned aerial vehicle 100 or alternatively may communicate with the unmanned aerial vehicle 100 via the network. In this manner, the communication interface 1022 may transfer send/receive data to/from a storage device in the DMA (direct memory access) mode, or alternatively, the CPU 1012 may transfer send/receive data by reading out data from a storage device or a communication interface 1022 as the transfer source and writing the data into a communication interface 1022 or a storage device as the transfer destination.

Furthermore, the CPU 1012 causes all or required parts of the file, database, or the like stored in the external storage device such as the hard disk drive 1024 and the DVD drive 1026 (the DVD-ROM 1001) to be read by the RAM 1014 through a DMA transfer or the like, and performs various processes on the data in the RAM 1014. The CPU 1012 then performs writeback of the data on which processing is completed into an external storage device by DMA transfer or the like. In such processing, the RAM 1014 can be regarded to temporarily retain contents of the external storage device, and therefore the RAM 1014, the external storage device and the like are collectively referred to as a memory, a memory unit, a storage device or the like in the present embodiment. Various types of information such as various types of programs, data, tables and databases in the present embodiment are stored on such a storage device, and are subjected to information processing. Note that the CPU 1012 can also retain a part of the RAM 1014 on a cache memory so as to perform reading/writing on the cache memory. In such a form, because the cache memory serves a part of the function of the RAM 1014, it is assumed that, in the present embodiment, the cache memory is also included in the RAM 1014, the memory, and/or the storage device unless it is distinctively indicated.

Moreover, the CPU 1012 performs, on data read out from the RAM 1014, various types of processings including various types of operations, information processing, conditional determination, information search/replacement, or the like described in the present embodiment that are specified in an instruction sequence of a program, and writes the data back into the RAM 1014. For example, when performing conditional determination, the CPU 1012 determines whether various types of variables shown in the present embodiment meet conditions such as being greater than, less than, greater than or equal to, and less than or equal to other variables or constants, and, when a condition is met (or when it is not met), branches to a different instruction sequence or calls a subroutine.

Moreover, the CPU 1012 can search information stored in files, databases, or the like within a storage device. For example, if a plurality of entries, each having an attribute value of a second attribute associated with an attribute value of a first attribute, are stored in a storage device, the CPU 1012 searches, from among the plurality of entries stored in the storage device, an entry having an attribute value of the first attribute that matches a specified condition, and reads out the attribute value of the second attribute stored in the entry, and it is thereby possible to obtain the attribute value of the second attribute associated with the first attribute that meets a predetermined condition.

The programs or modules shown above may also be stored in an external recording medium. An optical recording medium such as a Blu-ray (registered trademark) or a CD, an optical magnetic recording medium such as an MO, a tape medium, a flexible disk, a semiconductor memory such as an IC card, or the like can be used as the recording medium, besides the DVD-ROM 1001. Moreover, a storage device such as a hard disk or a RAM provided to a server system connected to a dedicated communication network or the Internet may be used as a recording medium, and a program may be provided to the computer 1000 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 body portion
12 light
15 leg portion
20 propelling portion
21 rotary wing
22 rotation driving portion
24 arm portion
30 camera
32 visible light camera
34 infrared camera
36 connecting portion
40 container holding portion 41 body
43 first end cover portion
44 second end cover portion
45 screw portion
50 discharge portion
51 discharge outlet
54 nozzle
60 container
70 temperature adjustment apparatus
71 temperature sensor
72 pipe
73 pump
74 reservoir
75 peltier device
76 heat sink
77 fan
80 discharge driving portion
81 cam
82 cam follower
83 movable plate
90 connectivity evaluation portion
95 image superimposition processing portion
100 unmanned aerial vehicle
110 subject
111 feature
112 feature point
114 metal hardware
116 scratch
118 boundary portion
119 surface profile
120 region
130 sprayed symbol
143 actuator
145 stem
150 different temperature area
200 image data processing system
300 image data processing method
500 discharge apparatus
1000 computer
1001 DVD-ROM
1010 host controller
1012 CPU
1014 RAM
1016 graphics controller
1018 display device
1020 input/output controller
1022 communication interface
1024 hard disk drive
1026 DVD drive
1030 ROM
1040 input/output chip
1042 keyboard

What is claimed is:

1. An image data processing system comprising: a discharge portion for discharging a content in a container onto a subject to form a sprayed symbol; a camera for capturing an image of a region including the sprayed symbol on the subject; and an image superimposition processing portion for performing an image superimposition process on the image using the sprayed symbol as a reference point, wherein the camera includes a visible light camera for a visible light image and an infrared camera for capturing a thermal image of the subject, the discharge portion is configured to use the content to form, on a surface of the subject, a different temperature area having a temperature that is different from those of other parts of the subject, the infrared camera is configured to capture the thermal image of a region including the different temperature area, and the image superimposition processing portion is configured to, in an image superimposition process on the thermal image and the visible light image, use the different temperature area and the sprayed symbol as reference points in the image superimposition process.

2. The mage data processing system according to claim 1, wherein the content includes a vaporizable component and the different temperature area is formed by vaporization heat generated when the content discharged onto the subject evaporates.

3. The image data processing system according to claim 1, further comprising a connectivity evaluation portion for evaluating a difficulty of the image superimposition process based on a continuity of a superimposed part of the image in the image superimposition process, wherein
if the connectivity evaluation portion evaluates that the image superimposition process on an image where the subject is captured is difficult, the discharge portion forms the sprayed symbol.

4. The image data processing system according to claim 3, wherein the connectivity evaluation portion is configured to perform a process to extract feature points in an image captured by the camera, and evaluate a difficulty of the image superimposition process based on a quantity of the obtained feature points.

5. The image data processing system according to claim 3, wherein the connectivity evaluation portion is configured to sense whether there is a periodic repeated pattern, and evaluate the difficulty based on a sensing result.

6. The image data processing system according to claim 3, wherein the connectivity evaluation portion is configured to attempt the image superimposition process on the image and evaluate the difficulty based on the attempt result.

7. The image data processing system according to claim 3, wherein the image superimposition process includes a connecting process on a plurality of images.

8. The image data processing system according to claim 1, wherein the image superimposition process includes a synthetic process on a plurality of images.

9. The image data processing system according to claim 1, further comprising a light for shooting in a dark.

10. The image data processing system according to claim 1, further comprising a temperature adjustment apparatus for adjusting a temperature of the content to a temperature that is different from a surface temperature of the subject.

11. The image data processing system according to claim 1, wherein the content is colored.

12. The image data processing system according to claim 1, wherein the container is an aerosol container.

13. An unmanned aerial vehicle that incorporates the image data processing system according to claim 1.

14. The image data processing system according to claim 1, further comprising a connectivity evaluation portion for evaluating a difficulty of the image superimposition process based on a continuity of a superimposed part of the image in the image superimposition process, wherein if the connectivity evaluation portion evaluates that the image superimposition process on an image where the subject 1s captured 1s difficult, the discharge portion forms the sprayed symbol.

15. An image data processing method comprising: discharging a content from a container incorporated in an unmanned aerial vehicle onto a subject to form a sprayed symbol; capturing a plurality of images related to a region of the subject including the sprayed symbol; and processing image data of the plurality of images using the sprayed symbol as a reference point for an image superimposition process, wherein the capturing includes a visible light camera for a visible light image and an infrared camera for capturing a thermal image of the subject, the discharging is configured to use the content to form, on a surface of the subject, a different temperature area having a temperature that is different from those of other parts of the subject, the infrared camera is configured to capture the thermal image of a region including the different temperature area, and the image superimposition process is configured to, in an image superimposition process on the thermal image and the visible light image, use the different temperature area and the sprayed symbol as reference points in the image superimposition process.

16. The image data processing method according to claim 15, comprising:

capturing a surface profile of the subject; and determining whether to discharge the content onto the subject based on the captured surface profile.

17. The image data processing method according to claim 16, wherein the determining whether to discharge the content onto the subject includes, in a case where the surface profile does not have unevenness deeper than a predetermined first threshold value, determining that the surface profile is a smooth surface and then determining to discharge the content.

18. The image data processing method according to claim 16, wherein the determining whether to discharge the content onto the subject includes, in a case where the surface profile has a scratch or unevenness deeper than a predetermined second threshold value, determining to discharge the content onto the subject, and capturing the plurality of images includes capturing the subject at a predetermined first distance, and capturing the subject at a second distance, which is farther than the first distance.

19. A non-transitory computer-readable recording medium that records a program that, when executed by a computer, causes the computer to perform steps of: discharging a content from a container incorporated in an unmanned aerial vehicle onto a subject to form a sprayed symbol; capturing a plurality of images related to a region of the subject including the sprayed symbol; and processing image data of the plurality of images using the sprayed symbol as a reference point for an image superimposition process, wherein the capturing includes a visible light camera for a visible light image and an infrared camera for capturing a thermal image of the subject, the discharging is configured to use the content to form, on a surface of the subject, a different temperature area having a temperature that is different from those of other parts of the subject, the infrared camera is configured to capture the thermal image of a region including the different temperature area, and the image superimposition process is configured to, in an image superimposition process on the thermal image and the visible light image, use the different temperature area and the sprayed symbol as reference points in the image superimposition process.

* * * * *